(12) United States Patent
Fokin et al.

(10) Patent No.: US 8,101,238 B2
(45) Date of Patent: Jan. 24, 2012

(54) POLYMERIC MATERIALS VIA CLICK CHEMISTRY

(75) Inventors: Valery Fokin, Oceanside, CA (US); M. G. Finn, San Diego, CA (US); K. Barry Sharpless, La Jolla, CA (US)

(73) Assignee: The Scripps Research Institute, La Jolla, CA (US)

( * ) Notice: Subject to any disclaimer, the term of this patent is extended or adjusted under 35 U.S.C. 154(b) by 782 days.

(21) Appl. No.: 11/632,783

(22) PCT Filed: Jul. 22, 2005

(86) PCT No.: PCT/US2005/026177
§ 371 (c)(1),
(2), (4) Date: Aug. 13, 2008

(87) PCT Pub. No.: WO2006/012569
PCT Pub. Date: Feb. 2, 2006

(65) Prior Publication Data
US 2008/0311412 A1 Dec. 18, 2008

Related U.S. Application Data

(60) Provisional application No. 60/590,885, filed on Jul. 22, 2004.

(51) Int. Cl.
*B05D 3/10* (2006.01)
*B29C 65/00* (2006.01)
(52) U.S. Cl. .................. 427/337; 427/207.1; 156/60
(58) Field of Classification Search .................. 427/337
See application file for complete search history.

(56) References Cited

OTHER PUBLICATIONS

Lummerstofer, T. et al, Click Chemistry on Surfaces: 1,3-Dipolar Cycloadditon Reactions of Azide terminiated Monolayers on Silica J. Phys. Chem. B 2004, 108, 3963-3966, NMA.*

* cited by examiner

*Primary Examiner* — Necholus Ogden, Jr.
(74) *Attorney, Agent, or Firm* — Olson & Cepuritis, Ltd.

(57) ABSTRACT

Adhesive polymers are formed when polyvalent azides and alkynes are assembled into crosslinked polymer networks by copper-catalyzed 1,3-dipolar cycloaddition. The condensation polymerization is efficiently promoted by Cu ions either leached from the metal surface or added to the monomer mixture, and strong interactions with metal surfaces are provided by the multiple triazole binding elements produced. The adhesive polymers may be formed either as adhesive polymer coatings or as adhesive polymer cement.

38 Claims, 15 Drawing Sheets

| Entry | di-azide | Tri-azide | di-alkyne | tri-alkyne | tetra-alkyne | $N_3$:CCH [a] | Load (kg) [b,c] | kg load per g adhesive |
|---|---|---|---|---|---|---|---|---|
| 1a | | | commercial glue (27 mg) [d] | | | | 6.7 | 248 ± 111 |
| 1b | | | commercial glue (42 mg) [d] | | | | 8.9 | 212 ± 71 |
| 1c | | | commercial glue (65 mg) [d] | | | | 6.3 | 97 ± 46 |
| 1d | | | commercial glue (100 mg) [d] | | | | 7.0 | 70 ± 30 |
| 2 | 1 | | 8 | | | 1:1 | 1.3 [1.3] | 32 ± 25 |
| 3 | 17 | | 8 | | | 1:1 | 1.3 [1.3] | 27 ± 21 |
| 4 | 4 | | 9 | | | 1:1 | 4.5 [5.7] | 161 ± 36 |
| 5 | 1 | | | 10 | | 1:1.5 | 4.0 [6.3] | 73 ± 18 |
| 6 | 1 | | | 10 | | 1:1 | 4.8 [7.1] | 68 ± 14 |
| 7 | 1 | | | 11 | | 1:1.5 | 5.9 [6.5] | 107 ± 18 |
| 8 | 1 | | | 12 | | 1:1.5 | 5.3 [5.9] | 96 ± 18 |
| 9 | 1 | | | 13 | | 1:1.5 | 2.5 [3.6] | 45 ± 18 |
| 10 | 4 | | | 14 | | 1:1.5 | 5.2 [6.2] | 164 ± 32 |
| 11 | 4 | | | 14 | | 1:1 | 11.0 [11.5] | 268 ± 24 |
| 12 | 1 | | | | 15 | 1:2 | 5.9 [7.0] | 99 ± 17 |
| 13 | | 5 | 2 | | | 1.5:1 | 4.0 [4.7] | 64 ± 16 |
| 14 | | 5 | 8 | | | 1.5:1 | 1.3 [1.3] | 28 ± 21 |
| 15 | | 5 | | 10 | | 1:1 | 7.0 [8.1] | 114 ± 16 |
| 16 | | 5 | | 11 | | 1:1 | 6.3 [7.0] | 102 ± 16 |
| 17 | | 5 | | 12 | | 1:1 | 5.4 [5.9] | 88 ± 16 |
| 18 | | 5 | | 13 | | 1:1 | 4.5 [6.4] | 72 ± 16 |
| 19 | | 5 | | 14 | | 1:1 | 7.5 [8.4] | 148 ± 20 |
| 20 | | 6 | | 14 | | 1:1 | 5.0 | 146 ± 29 |
| 21 | | 7 | | 14 | | 1:1 | 5.6 | 171 ± 31 |
| 22 | | 5 | | | 15 | 3:4 | 5.9 [7.0] | 89 ± 15 |
| more complex mixtures | | | | | | | | |
| 23 | 1 + 17 | | 8 | 10 | | 4:5 | 3.6 [4.7] | 70 ± 19 |
| 24 | 1 + 17 | | | 10 + 11 | | 1:1.5 | 5.9 [5.9] | 100 ± 17 |
| control experiments | | | | | | | | |
| 25 | monoazide 16 | | | 10 | | 1:3 | 1.3 | |
| 26 | 1 | | | | | | 0 [0] | |
| 27 | | | | 10 | | | 0 [6.5] | |
| 28 | 1 | | | 10 | | 1:1.5 | 0 [0] | |

FIG. 9

| entry | azide | MW azide | alkyne | MW alkyne | mmol azide | mmol alkyne | maximum load (kg) | mg | kg load per g adhesive |
|---|---|---|---|---|---|---|---|---|---|
| 1a | | | Weld-It® | | | | 6.7 ± 3 | 27 | 248 ± 111 |
| 1b | | | Weld-It® | | | | 8.9 ± 3 | 42 | 212 ± 71 |
| 1c | | | Weld-It® | | | | 6.3 ± 3 | 65 | 97 ± 46 |
| 1d | | | Weld-It® | | | | 7.0 ± 3 | 100 | 70 ± 30 |
| 2 | 1 | 309.35 | 8 | 94.11 | 0.10 | 0.10 | 1.3 ± 1 | 40 | 32 ± 25 |
| 3 | 17 | 388.45 | 8 | 94.11 | 0.10 | 0.10 | 1.3 ± 1 | 48 | 27 ± 21 |
| 4 | 4 | 186.17 | 9 | 93.13 | 0.10 | 0.10 | 4.5 ± 1 | 28 | 161 ± 36 |
| 5 | 1 | 309.35 | 10 | 240.26 | 0.10 | 0.10 | 4.0 ± 1 | 55 | 73 ± 18 |
| 6 | 1 | 309.35 | 10 | 240.26 | 0.15 | 0.10 | 4.8 ± 1 | 70 | 68 ± 14 |
| 7 | 1 | 309.35 | 11 | 240.25 | 0.10 | 0.10 | 5.9 ± 1 | 55 | 107 ± 18 |
| 8 | 1 | 309.35 | 12 | 240.25 | 0.10 | 0.10 | 5.3 ± 1 | 55 | 96 ± 18 |
| 9 | 1 | 309.35 | 13 | 250.29 | 0.10 | 0.10 | 2.5 ± 1 | 56 | 45 ± 18 |
| 10 | 4 | 186.17 | 14 | 131.17 | 0.10 | 0.10 | 5.2 ± 1 | 32 | 164 ± 32 |
| 11 | 4 | 186.17 | 14 | 131.17 | 0.15 | 0.10 | 11.0 ± 1 | 41 | 268 ± 24 |
| 12 | 1 | 309.35 | 15 | 288.34 | 0.10 | 0.10 | 5.9 ± 1 | 60 | 99 ± 17 |
| 13 | 5 | 375.4 | 2 | 247.31 | 0.10 | 0.10 | 4.0 ± 1 | 62 | 64 ± 16 |
| 14 | 5 | 375.4 | 8 | 94.11 | 0.10 | 0.10 | 1.3 ± 1 | 47 | 28 ± 21 |
| 15 | 5 | 375.4 | 10 | 240.26 | 0.10 | 0.10 | 7.0 ± 1 | 62 | 114 ± 16 |
| 16 | 5 | 375.4 | 11 | 240.25 | 0.10 | 0.10 | 6.3 ± 1 | 62 | 102 ± 16 |
| 17 | 5 | 375.4 | 12 | 240.25 | 0.10 | 0.10 | 5.4 ± 1 | 62 | 88 ± 16 |
| 18 | 5 | 375.4 | 13 | 250.29 | 0.10 | 0.10 | 4.5 ± 1 | 63 | 72 ± 16 |
| 19 | 5 | 375.4 | 14 | 131.17 | 0.10 | 0.10 | 7.5 ± 1 | 51 | 148 ± 20 |
| 20 | 6 | 211.18 | 14 | 131.17 | 0.10 | 0.10 | 5.0 ± 1 | 34 | 146 ± 29 |
| 21 | 7 | 196.17 | 14 | 131.17 | 0.10 | 0.10 | 5.6 ± 1 | 33 | 171 ± 31 |
| 22 | 5 | 375.4 | 15 | 288.34 | 0.10 | 0.10 | 5.9 ± 1 | 66 | 89 ± 15 |
| 23 | 1+17 | 348.9 | 8+10 | 167.185 | 0.10 | 0.10 | 3.6 ± 1 | 52 | 70 ± 19 |
| 24 | 1+17 | 348.9 | 10+11 | 240.255 | 0.10 | 0.10 | 5.9 ± 1 | 59 | 100 ± 17 |

FIG. 10

| Entry | monomers (mmol) | Additive (mmol) [a] | max. load (kg) [b] | kg load per g adhesive [c] |
|---|---|---|---|---|
| 1a | | Weld-It® (27 mg) | 7.8 | 289 ± 111 |
| 1b | | Weld-It® (42 mg) | 8.1 | 193 ± 71 |
| 1c | | Weld-It® (65 mg) | 6.1 | 94 ± 46 |
| 1d | | Weld-It® (100 mg) | 7.8 | 78 ± 30 |
| 2 | 1 + 10 (0.15 + 0.10) | None | 0 | – |
| 3 | 1 + 10 (0.15 + 0.10) | CuI (0.015) | 6.2 | 88 ± 14 |
| 4 | 1 + 10 (0.15 + 0.10) | CuI (0.03) | 8.2 | 116 ± 14 |
| 5 | 1 + 10 (0.15 + 0.10) | CuI (0.30) | 4.5 | 64 ± 14 |
| 6 | 1 + 10 (0.15 + 0.10) | CuI (0.40) | 5.0 | 71 ± 14 |
| 7 | 1 + 10 (0.15 + 0.10) | $CuSO_4 \cdot 5H_2O$ (0.30) | 4.7 | 67 ± 14 |
| 8 | 5 + 10 (0.10 + 0.10) | None | 0 | – |
| 9 | 5 + 10 (0.10 + 0.10) | CuI (0.03) | 10.5 | 101 ± 16 |
| 10 | 4 + 10 (0.15 + 0.10) | CuI + sodium ascorbate (0.03 + 0.03) | 6.0 | 119 ± 19 |
| 11 | 4 + 14 (0.15 + 0.10) | None | 0 | – |
| 12 | 4 + 14 (0.15 + 0.10) | CuI (0.03) | 0 | – |
| 13 | 4 + 14 (0.15 + 0.10) | CuI + hydroquinone (0.03 + 0.03) | 0 | – |
| 14 | 6 + 14 (0.10 + 0.10) | CuI (0.03) | 0 | – |
| 15 | 7 + 14 (0.10 + 0.10) | CuI (0.03) | 0 | – |
| 16 | 6 + 10 (0.10 + 0.10) | CuI (0.03) | 0 | – |
| 17 | 7 + 10 (0.10 + 0.10) | CuI (0.03) | 0 | – |

FIG. 11

| Entry | monomers (mmol) | Additive (mmol) [a] | max. load (kg) [b] | kg load per g adhesive [c] |
|---|---|---|---|---|
| 1a | | Weld-It® (27 mg) | 7.8 | 289 ± 111 |
| 1b | | Weld-It® (42 mg) | 8.1 | 193 ± 71 |
| 1c | | Weld-It® (65 mg) | 6.1 | 94 ± 46 |
| 1d | | Weld-It® (100 mg) | 7.8 | 78 ± 30 |
| 2 | 1 + 10 (0.15 + 0.10) | None | 0 | – |
| 3 | 1 + 10 (0.15 + 0.10) | CuI (0.015) | 6.2 | 88 ± 14 |
| 4 | 1 + 10 (0.15 + 0.10) | CuI (0.03) | 8.2 | 116 ± 14 |
| 5 | 1 + 10 (0.15 + 0.10) | CuI (0.30) | 4.5 | 64 ± 14 |
| 6 | 1 + 10 (0.15 + 0.10) | CuI (0.40) | 5.0 | 71 ± 14 |
| 7 | 1 + 10 (0.15 + 0.10) | $CuSO_4 \cdot 5H_2O$ (0.30) | 4.7 | 67 ± 14 |
| 8 | 5 + 10 (0.10 + 0.10) | None | 0 | – |
| 9 | 5 + 10 (0.10 + 0.10) | CuI (0.03) | 10.5 | 101 ± 16 |
| 10 | 4 + 10 (0.15 + 0.10) | CuI + sodium ascorbate (0.03 + 0.03) | 6.0 | 119 ± 19 |
| 11 | 4 + 14 (0.15 + 0.10) | None | 0 | – |
| 12 | 4 + 14 (0.15 + 0.10) | CuI (0.03) | 0 | – |
| 13 | 4 + 14 (0.15 + 0.10) | CuI + hydroquinone (0.03 + 0.03) | 0 | – |
| 14 | 6 + 14 (0.10 + 0.10) | CuI (0.03) | 0 | – |
| 15 | 7 + 14 (0.10 + 0.10) | CuI (0.03) | 0 | – |
| 16 | 6 + 10 (0.10 + 0.10) | CuI (0.03) | 0 | – |
| 17 | 7 + 10 (0.10 + 0.10) | CuI (0.03) | 0 | – |

FIG. 12

| entry | azide | alkyne | mmol monomers[a] | ratio[a] | GAP | max. load | kg load per g adhesive[b] |
|---|---|---|---|---|---|---|---|
| 1a | 1 | 10 | 0.20 | 1:1.5 | − | 4.0 | 73 ± 18 |
| 1b | 1 | 10 | 0.36 | 1:1.5 | − | 12.7 | 128 ± 10 |
| 2a | 1 | 10 | 0.20 | 1:1.5 | + | 6.3 | |
| 2b | 1 | 10 | 0.36 | 1:1.5 | + | 13.8 | |
| 3a | 1 | 10 | 0.25 | 1:1 | − | 4.8 | 68 ± 14 |
| 3b | 1 | 10 | 0.35 | 1:1 | − | 10.7 | 109 ± 10 |
| 4a | 1 | 10 | 0.25 | 1:1 | + | 7.1 | |
| 4b | 1 | 10 | 0.35 | 1:1 | + | 11.4 | |
| 5a | 4 | 14 | 0.25 | 1:1 | − | 11.0 | 268 ± 24 |
| 5b | 4 | 14 | 0.60 | 1:1 | − | 15.0 | 152 ± 10 |
| 6a | 4 | 14 | 0.25 | 1:1 | + | 11.5 | |
| 6b | 4 | 14 | 0.60 | 1:1 | + | 15.2 | |
| 7a | 5 | 14 | 0.2 | 1:1 | − | 7.5 | 148 ± 20 |
| 7b | 5 | 14 | 0.4 | 1:1 | − | 11.7 | 115 ± 10 |
| 8a | 5 | 14 | 0.2 | 1:1 | + | 8.4 | |
| 8b | 5 | 14 | 0.4 | 1:1 | + | 12.2 | |
| 9a | 6 | 14 | 0.2 | 1:1 | − | 5.0 | 146 ± 29 |
| 9b | 6 | 14 | 0.3 | 1:1 | − | 10.4 | 203 ± 19 |
| 10a | 7 | 14 | 0.2 | 1:1 | − | 5.6 | 171 ± 31 |
| 10b | 7 | 14 | 0.3 | 1:1 | − | 17.8 | 363 ± 20 |

FIG. 13

| Entry[a] | di-azide | Tri-azide | Tri-alkyne | additive | $N_3$:CCH | Load (kg) |
|---|---|---|---|---|---|---|
| 1* | 4 | | 14 | None | 1:1 | 11.0 (11.5) |
| 2 | 4 | | 14 | CuI (0.03 mmol in MeCN) | 1:1 | 9.3 (10.5) |
| 3* | 1 | | 10 | none | 1:1.5 | 4.0 |
| 4 | 1 | | 10 | $Cu_2O$ + $CuSO_4$ (0.01 mmol each)[b] | 1:1.5 | 5.2 |
| 5 | 1 | | 10 | $Cu_2O$ (0.015 mmol) | 1:1.5 | 5.3 |
| 6 | 1 | | 10 | $CuSO_4$ (0.3 mmol) | 1:1.5 | 5.2 |
| 7* | 1 | | 10 | none | 1:1 | 4.8 |
| 8 | 1 | | 10 | dendrimer[c] | 1:1 | 7.1 |
| 9* | | 5 | 10 | none | 1:1 | 7.0 |
| 10 | | 5 | 10 | dendrimer[c] | 1:1 | 7.9 |

FIG. 14

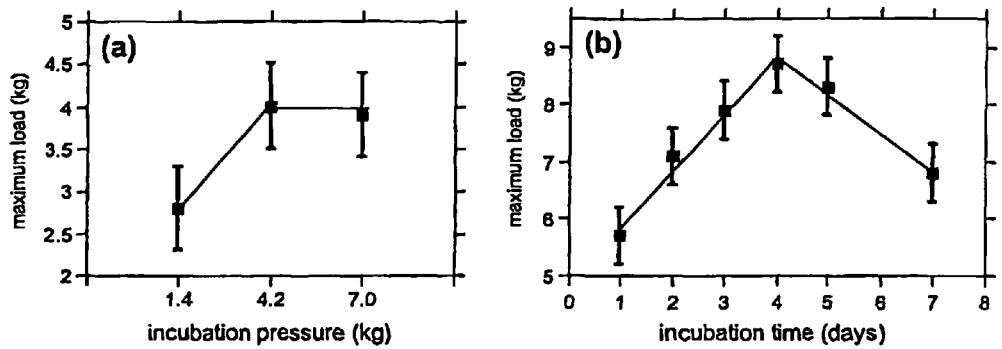
FIG. 15
| sample | components | mmol Cu | Cu/triazole | max. load | kg load per g adhesive |
|---|---|---|---|---|---|
| (A) (Table S1, entry 2) | 1 + 8 | 0.031 ± 0.005 | 0.16 ± 0.03 | 1.3 kg | 32 ± 25 |
| (B) (Table S1, entry 6) | 1 + 10 | 0.025 ± 0.004 | 0.083 ± 0.02 | 4.8 kg | 68 ± 14 |
| (C) (Table S1, entry 11) | 4 + 14 | 0.015 ± 0.004 | 0.050 ± 0.015 | 11.0 kg | 268 ± 24 |
FIG. 16
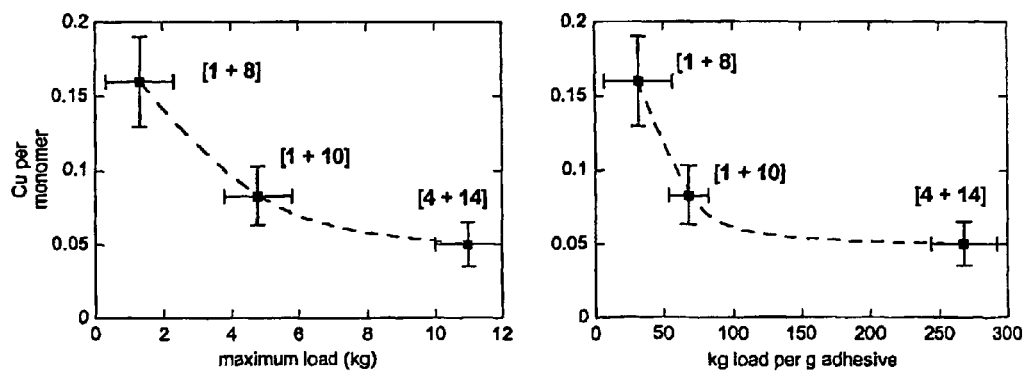
FIG. 17

POLYMERIC MATERIALS VIA CLICK CHEMISTRY

This invention was made with United States Government support under Contract No. GM 28384 by the National Institutes of Health and Contract No. CHE-9985553 by the National Science Foundation. The United States Government has certain rights in the invention.

TECHNICAL FIELD

The invention relates to adhesive polymer coatings and cement. More particularly, the invention relates to the use of click chemistry for making adhesive polymer coatings and cement.

BACKGROUND

The term "click chemistry" is applied to a collection of supremely reliable and self-directed organic reactions (Kolb, H. C.; Finn, M. G.; Sharpless, K. B. Angew. Chem. Int. Ed. 2001, 40, 2004-2021). For example, the identification of the copper catalyzed azide-alkyne [3+2]cycloaddition as a highly reliable molecular connection in water (Rostovtsev, V. V.; et al. Angew. Chem. Int. Ed. 2002, 41, 2596-2599) has been used to augment several types of investigations of biomolecular interactions (Wang, Q.; et al. J. Am. Chem. Soc. 2003, 125, 3192-3193; Speers, A. E.; et al. J. Am. Chem. Soc. 2003, 125, 4686-4687; Link, A. J.; Tirrell, D. A. J. Am. Chem. Soc. 2003, 125, 11164-11165; Deiters, A.; et al. J. Am. Chem. Soc. 2003, 125, 11782-11783). In addition, applications to organic synthesis (Lee, L. V.; et al. J. Am. Chem. Soc. 2003, 125, 9588-9589), drug discovery (Kolb, H. C.; Sharpless, K. B. Drug Disc. Today 2003, 8, 1128-1137; Lewis, W. G.; et al. Angew. Chem. Int. Ed. 2002, 41, 1053-1057), and the functionalization of surfaces (Meng, J.-C.; et al. Angew. Chem. Int. Ed. 2004, 43, 1255-1260; Fazio, F.; et al. J. Am. Chem. Soc. 2002, 124, 14397-14402; Collman, J. P.; et al. Langmuir 2004, ASAP, in press; Lummerstorfer, T.; Hoffmann, H. J. Phys. Chem. B 2004, in press) have also appeared.

The copper-catalyzed azide-alkyne ligation process has emerged as a unique combination of selective reactivity and "bullet-proof" scope (Rostovtsev, V. V.; et al. Angew. Chem. Int. Ed. 2002, 41, 2596-2599; Tornøe, C. W.; et al. J. Org. Chem. 2002, 67, 3057-3062). The use of Cu(I) catalysts accelerates the process by factors up to $10^7$ while preserving the inertness of both azides and alkynes toward the vast majority of functional groups and conditions that are typical of the terrestrial environment (Rostovtsev, V. V.; et al. Angew. Chem. Int. Ed. 2002, 41, 2596-2599; Wang, Q.; et al. J. Am. Chem. Soc. 2003, 125, 3192-3193). Recently, click chemistry has been employed in a clean synthesis of triazole-containing dendrimers (Wu, P.; et al. Angew. Chem. Int. Ed. 2004, in press).

Polymer synthesis depends on a limited number of reactions that include many of the best examples of click reactivity. However, the champion "click" process, the copper-catalyzed azide-alkyne cycloaddition, has yet to be so employed (For examples of condensation polymers formed from non-catalyzed azide cycloaddition, among other reactions, see: N. G. Rogov, E. P. Kabanova, I. G. Gruzdeva, Ross. Khim. Zh. 1997, 41, 115-119).

What is needed is a process that employs click chemistry to construct polymeric materials, including adhesive polymeric coatings and cement. What is needed is a click chemistry process that employs di-, tri-, and tetravalent azides and alkynes to create robust, crosslinked polymers of 1,2,3-triazoles which serve to bond to metal, glass, plastic, and other surfaces as adhesive polymeric coatings or which are employable as adhesive polymeric cements for bonding such surfaces to one another.

SUMMARY

The copper(I)-catalyzed cycloaddition reaction between azides and alkynes has been employed herein to make adhesive materials, i.e., adhesive polymeric coatings and adhesive polymeric cement. In a preferred mode, the process is performed on a copper containing surface using monomer mixtures that lack copper salt. In this instance, the copper containing surface supplies the necessary catalytic copper (I) ions, thereby causing the polymerization process to occur selectively on such surfaces. In another mode, the process is performed on reducing metal surfaces using monomer mixtures that include a copper salt. In this instance, the catalytic copper (I) is supplied by a reduction of the copper salt within the mixture by the reducing metal surface. The resulting materials were found to possess comparable or superior adhesive strength to standard commercial glues, and structure-activity correlations have identified several important properties of the monomers in this regard.

One aspect of the invention is directed to a process for forming an adhesive polymer coating on a solid surface. The process comprises two steps. In one step, a mixture of multivalent monomers is applied onto the solid surface. The mixture of multivalent monomers includes both monomers having multiple azide functionalities and monomers having multiple terminal alkyne functionalities. In the other step, a polymerization is catalyzed between the monomers having multivalent azide functionalities and the monomers having multivalent terminal alkyne functionalities. The catalyzed polymerization reaction causes the formation of the adhesive polymer coating on the solid surface. In a preferred mode, the polymerization of the monomers is catalyzed by $Cu^+$. In one aspect of this preferred mode, the solid surface includes copper and, in the catalysis step, the $Cu^+$ originates from the solid surface. The solid surface may be copper or an alloy containing copper wherein copper makes up the majority of the metal in the alloy, such as brass. The solid surface may merely have a copper plating. In another aspect of this preferred mode, the solid surface includes a reducing agent, the mixture also includes a source of copper salt that potentially includes $Cu^{++}$, and in the catalysis step, the $Cu^+$ originates, at least in part, from a reduction of the $Cu^{++}$ within the mixture by the reducing agent of the solid surface. For example, the reducing agent of the solid surface may be a metal capable of reducing $Cu^{++}$ to $Cu^+$. Preferred metals include copper, zinc, iron, aluminum, and magnesium or alloys of copper, zinc, iron, aluminum, and magnesium. Within this aspect of the preferred mode, the copper salt within the mixture is 10 mol % relative to at least one of the multivalent monomers. Preferred multivalent monomers may each be independently represented by Formula I:

R-[Core]-(X-RG)$_n$.　　　　　　　　　　(Formula I)

In Formula I, the "Core" is a multiradical core and is selected from the group of multiradicals consisting of aliphatic, aryl, heteroaryl, amine, alkenyl, ether, carbonate, carbamate, sulfonyl, sulfate, thioether, selenyl ether, and urea; R is a functionality that binds to metal ions or to metal surfaces and is absent or selected from the group of radicals consisting of amine, heteroaryl, carboxylate, sulfate, thiol, and hydroxyl; RG is a functionality and is selected from the group consisting of azide and terminal alkyne; X is a linker for linking RG to the "Core" and is optionally absent or selected from the group of diradicals consisting of alkyl (C1-C20), alkenyl, alkynyl, alkoxy, alkylthio, alkylamine; aryl, heteroaryl, and heteroaromatic; and "n" is 2 or greater. Preferred monomers may be represented by the following structures:

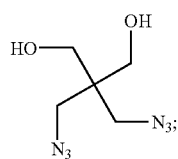

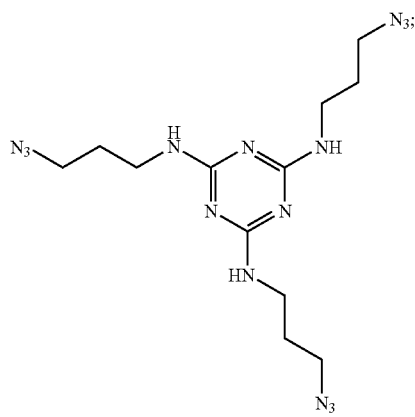

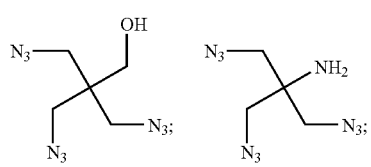

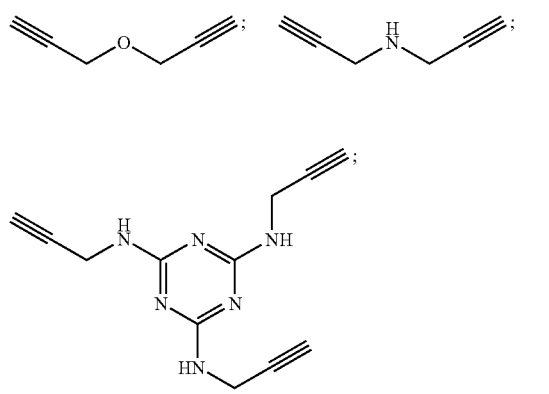

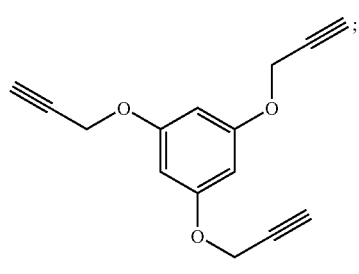

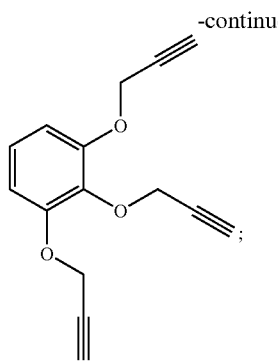

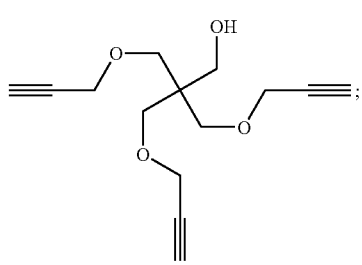

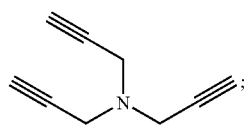

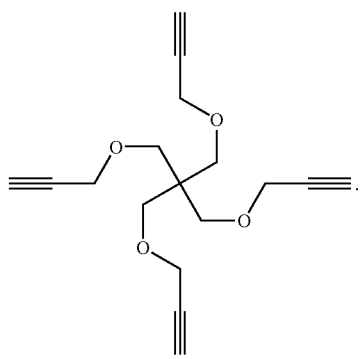

Alternatively, the preferred monomers may be represented by the following structures:

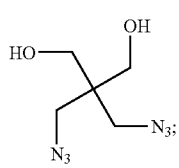

-continued

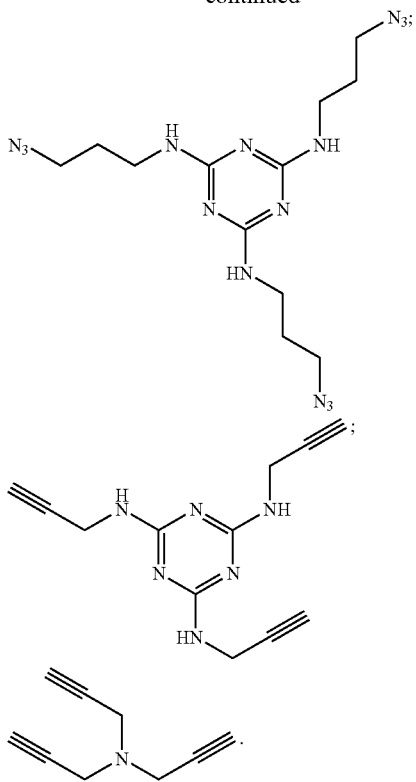

Alternatively, the preferred monomers may be represented by the following structures:

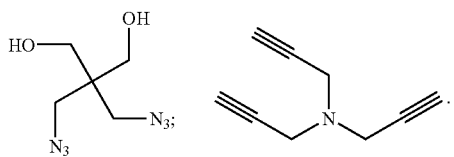 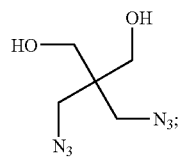

The application step of this process may include the substeps of forming the mixture by dissolving the multivalent monomers in an organic solvent, with or without a copper salt; then distributing the mixture in a uniform manner on the cleaned solid; and allowing the organic solvent to evaporate from the distributed mixture.

Another aspect of the invention is directed to an adhesive polymer coating formed on a solid surface according to any of the processes described above.

Another aspect of the invention is directed to a process for forming an adhesive polymer cement between two or more solid surfaces. The process comprises two steps. In one step, a mixture of multivalent monomers is applied between the solid surfaces. The mixture of multivalent monomers includes both monomers having multiple azide functionalities and monomers having multiple terminal alkyne functionalities. In the other step, a polymerization of the monomers having multivalent azide functionalities with the monomers having multivalent terminal alkyne functionalities is catalyzed for forming the adhesive polymer cement between the solid surfaces. In a preferred mode, the polymerization of the monomers is catalyzed by $Cu^+$. In a preferred mode, the polymerization of the monomers is catalyzed by $Cu^+$. In one aspect of this preferred mode, the solid surface includes copper and, in the catalysis step, the $Cu^+$ originates from the solid surface. The solid surface may be copper or an alloy containing copper wherein copper makes up the majority of the metal in the alloy, such as brass. The solid surface may merely have a copper plating. In another aspect of this preferred mode, the solid surface includes a reducing agent, the mixture also includes a source of copper salt that potentially includes $Cu^{++}$, and, in the catalysis step, the $Cu^+$ originates, at least in part, from a reduction of the $Cu^{++}$ within the mixture by the reducing agent of the solid surface. For example, the reducing agent of the solid surface may be a metal capable of reducing $Cu^{++}$ to $Cu^+$. Preferred metals include copper, zinc, iron, aluminum, and magnesium or alloys of copper, zinc, iron, aluminum, and magnesium. Within this aspect of the preferred mode, the copper salt within the mixture is 10 mol % relative to at least one of the multivalent monomers. Preferred multivalent monomers may each be independently represented by Formula I:

$$R-[Core]-(X-RG)_n. \qquad \text{(Formula I)}$$

In Formula I, the "Core" is a multiradical core and is selected from the group of multiradicals consisting of aliphatic, aryl, heteroaryl, amine, alkenyl, ether, carbonate, carbamate, sulfonyl, sulfate, thioether, selenyl ether, and urea; R is a functionality that binds to metal ions or to metal surfaces and is absent or selected from the group of radicals consisting of amine, heteroaryl, carboxylate, sulfate, thiol, and hydroxyl; RG is a functionality and is selected from the group consisting of azide and terminal alkyne; X is a linker for linking RG to the "Core" and is optionally absent or selected from the group of diradicals consisting of alkyl (C1-C20), alkenyl, alkynyl, alkoxy, alkylthio, alkylamine, aryl, heteroaryl, and heteroaromatic; and "n" is 2 or greater.

Preferred monomers may be represented by the following structures:

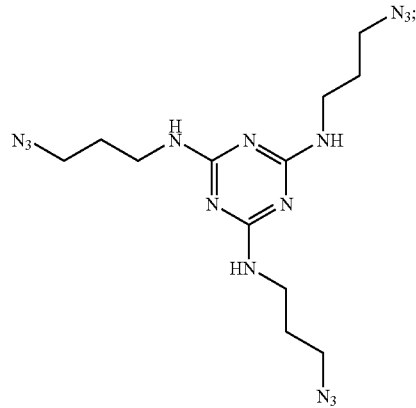

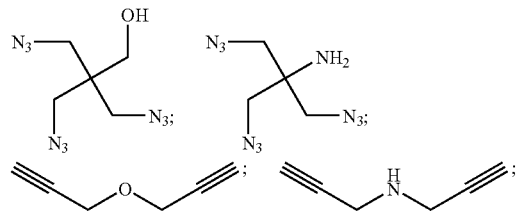

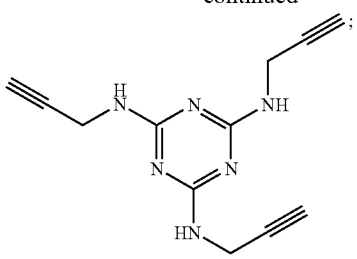

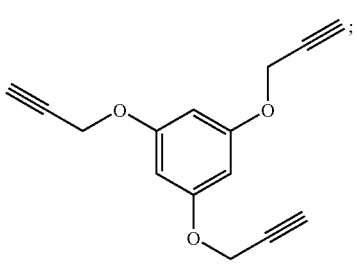

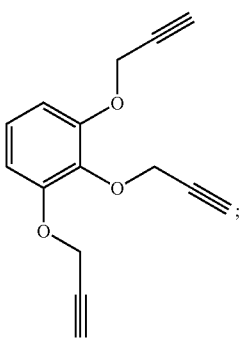

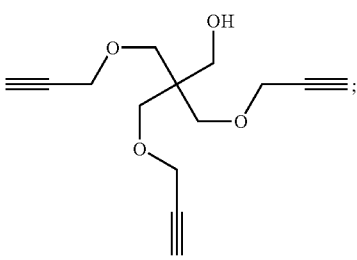

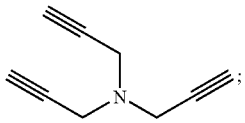

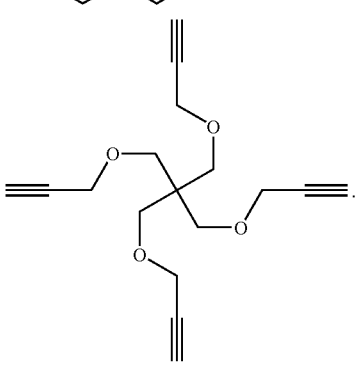

Alternatively, the preferred monomers may be represented by the following structures:

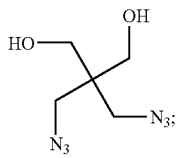

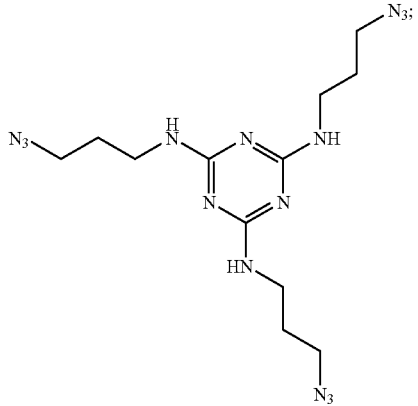

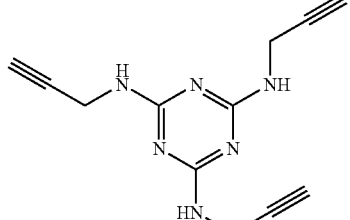

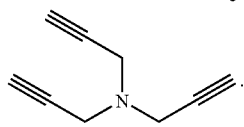

Alternatively, the preferred monomers may be represented by the following structures:

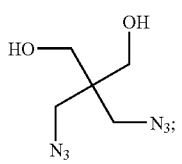 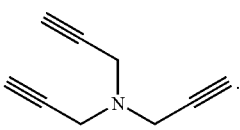

The application step of this process may include the substeps of forming the mixture by dissolving the multivalent monomers in an organic solvent, with or without a copper salt; then distributing the mixture in a uniform manner on the cleaned solid; and allowing the organic solvent to evaporate from the distributed mixture. The catalysis step of this process may include the substep of placing the solid surfaces into physical contact with each other with an application of a constant pressure while catalyzing the polymerization of the monomers.

Another aspect of the invention is directed to an adhesive polymer cement formed between two or more solid surfaces according to the process described above.

Copper-promoted azide-alkyne cycloaddition is a convenient method for synthesizing bulk polymers with adhesive properties. It is disclosed herein that some of the same monomers employed to synthesize the bulk polymer also create adhesive bonds to glass, plastic, metals, and other solid surfaces for forming adhesive coatings and cement for allowing for fusion of these materials to one another.

BRIEF DESCRIPTION OF FIGURES

FIG. 9 is a table of the starting monomers, ratio of reagents and strength of the resulting adhesive as measured.

FIG. 10 is a table that shows the calculation of kg load per g adhesive values shown in FIG. 9. The experiments performed with GAP are not shown here.

FIG. 11 is a table that summarizes the preliminary measurements of adhesive strength for zinc plates.

FIG. 12 is a table that summarizes the kg load per g adhesive results for zinc plates.

FIG. 13 is a table that shows the maximum load as a function of amounts of monomers used.

FIG. 14 is a table showing experiments where additives were incorporated.

FIG. 15 is two charts showing the dependence of adhesive strength on the indicated variables.

FIG. 16 is a table comparing the copper content of adhesive mixtures.

FIG. 17 is two graphs showing the amount of copper contained within the adhesive polymer vs. adhesive strength (left) and adhesive strength per unit weight adhesive (right).

DETAILED DESCRIPTION

Figure 1:
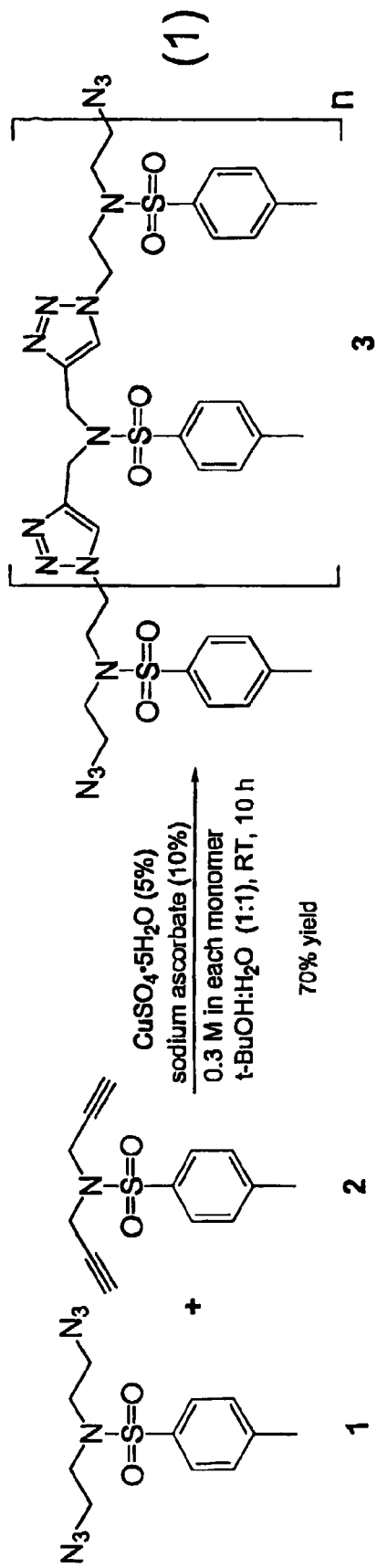
FIG. 1 shows the copper-catalyzed [3+2]cycloaddition of the diazide 1 with the dialkyne 2 to give a linear polymer represented by structure 3.

That the copper-catalyzed [3+2] cycloaddition can provide polymers was shown by the condensation of diazide 1 with dialkyne 2 (FIG. 1). The resulting linear polymer, 3, was found to be a DMSO-soluble material with broad molecular weight distribution extending up to $(1)_{23}(2)_{22}$ (m/z=12,565) (Experimental details are available from the authors upon request). Other examples using A-B monomers (rather than the A-A+B-B combination represented by 1+2) have been prepared and will be reported separately.

Figure 2:
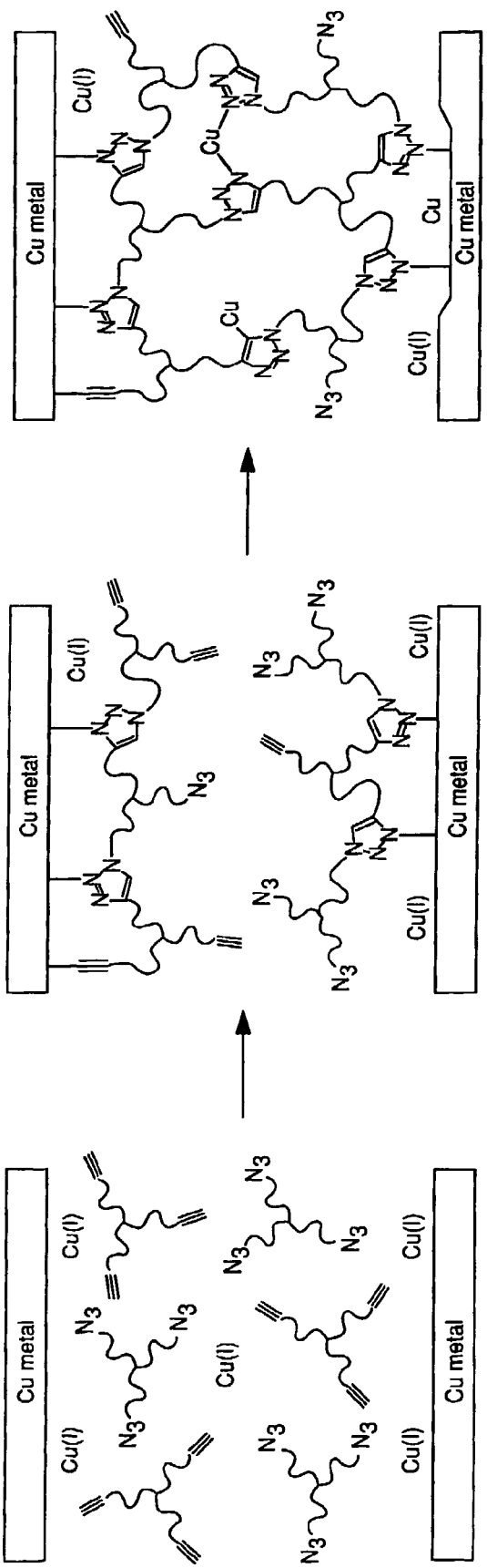
FIG. 2 shows a series of events leading to adhesion to copper by the formation of networked triazoles.

The successful formation of an adhesive on copper surfaces requires the metal to function in at least two crucial ways depicted in FIG. 2. It must serve as a source of Cu(I) for the formation of copper acetylide, the key intermediate in the triazole-forming reaction, at both the metal surface and in the developing organic matrix. The bulk metal must also bind to the growing polymer, by virtue of interactions of the surface with multiple triazoles (and perhaps also with other groups, including dangling alkynes in σ- or π-interactions). It is possible that the polymer-forming process can also "etch" the surface by extraction of copper ions, creating a surface binding region with a blurred boundary between the various copper species and the triazole backbone.

Each of the above required functions of copper metal has ample precedent. Metallic copper has been found to be a convenient source of Cu(I) ions for effective azide-alkyne cycloaddition (Rostovtsev, V. V.; et al. *Angew. Chem. Int. Ed.* 2002, 41, 2596-2599; Wang, Q.; et al. *J. Am. Chem. Soc.* 2003, 125, 3192-3193). The process is likely to proceed by a comproportionation of Cu(II) (created by oxidation of surface metal or added to the solution) with the Cu(0) surface. The active Cu(I) thus generated, when quenched by air oxidation in solution, can be regenerated at the metal surface. In this way, a low concentration of Cu(I) is maintained, on the order of 200-700 µM for reactions in tert-butanol/water (Fokin, V. V., unpublished results). Furthermore, it has long been known that 1,2,4- and 1,2,3-triazoles have a strong affinity for metal ions and surfaces, and both small molecules and polymers containing these units are used as anticorrosive agents (Trachli, B.; et al. *Corros. Sci.* 2002, 44, 997-1008; Cao, P. G.; Yao, J. L.; Zheng, J. W.; Gu, R. A.; Tian, Z. Q. *Langmuir* 2002, 18, 100-104; El-Naggar, M. M. *J. Mat. Sci.* 2000, 35, 6189-6195; Qafsaoui, W.; et al. *J. Appl. Electrochem.* 2000, 30, 959-966; Lilyquist, M. R.; Monsanto Corp.: USA, 1967; Korpics, C. J. *Anti-Corrosion Methods and Materials* 1974, 21, 11-13). It thus seemed possible that polymeric 1,2,3-triazoles would demonstrate metal adhesive qualities; indeed, triazoles incorporated into polymer structures have been found to enhance binding to copper (Seo, J.; et al. *J. Adhes. Sci. Tech.* 2002, 16, 1839-1851; Song, S. M.; Cho, K.; Park, C. E.; Yun, H. K.; Oh, S. Y. *J. Appl. Polym. Sci.* 2002, 85, 2202-2210; Kent, M. S., R.; Hurst, M.; Small, J.; Emerson, J.; Zamora, D. Sandia National Laboratories [Technical Report] 1997, SAND97-1030, 1-60). It is disclosed herein that the use of trifunctional (and higher) monomers would give rise to crosslinked networks when applied onto copper-containing materials.

Figure 4:
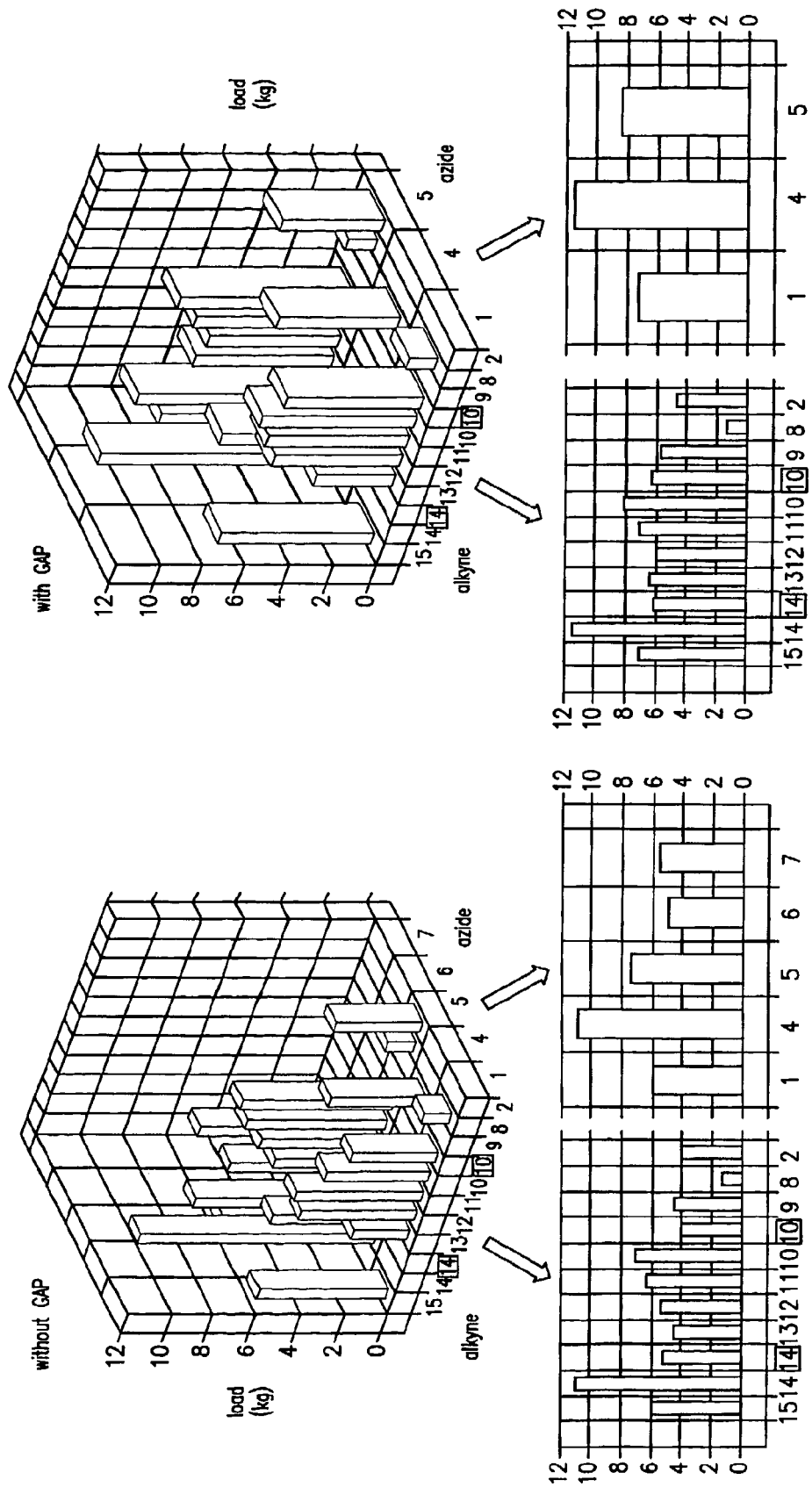
FIG. 4 is a three-dimensional chart summarizing the results of the combinations of the different polymers tested.

A selection of di-, tri-, and tetravalent alkynes and azides (1, 2, 4-15) was tested for the ability to form adhesive polymers (Monomers were mixed in concentrated stock solutions using the minimum necessary amount of organic solvent (usually THF, 0.5 M in each monomer). The required amount of stock mixture was then deposited at the center of each plate, and the mixture was manually spread over the relevant region of the plate (previously marked in pencil) while the solvent evaporated. The two plates were then crossed at right angles to bring the treated surfaces in contact with each other, and allowed to anneal under controlled conditions). The experimental procedure consisted of spreading a mixture of monomers dissolved in the minimum amount of solvent over the surface of two metal plates, and pressing the crossed plates together under well-defined conditions of pressure, temperature, and time after evaporation of the solvent. The approximate adhesive power of each material formed was determined by measuring the force normal to the surface required to separate the adhered plates (a simplified "peel" test). The maximum loads supported are shown in FIG. 2; the error of these averaged measurements (three independent replicates per experiment) was found to be a relatively small ±1 kg (Measurements with the commercial adhesive most often tested in this work were less reproducible, with an error of ±3 kg). The use of a polymer containing side-chain azides ("glycidyl azide polymer", GAP, a commercially-available product of azide substitution on the ring-opening polymer of glycidyl chloride) was also tested by pre-treating the metal surfaces with the polymer and then depositing additional monomers as before. This was done to test the notion that pre-coating the metal surface with an azide-containing polymer might lead to a higher density of triazoles at the metal interface, and therefore to greater adhesive power. The results of these tests are also shown in FIG. 4. While the general observed trend was toward better adhesive properties, the effect of GAP was not dramatic and no structure-activity trends were changed with its use. While many samples formed strong bonds to copper, mixtures involving tripropargylamine (14) and, to a lesser extent, trialkyne 10, significantly outperformed the commercial glues.

Two factors appear to be most important in determining the power of azide/alkyne adhesive mixtures: the number of "arms" of the monomeric units, and the presence of an amine group. The former factor is presumably related to the degree of crosslinking of the resulting polymer. Thus, combinations of diazides with dialkynes (such as 1+8) gave poor results, since such reactions should produce linear, rather than covalently cross-linked, polymers analogous to 3. It is unlikely that catenated structures are formed efficiently by ring closure, but such possibilities are being explored separately. The efficacy of amine-containing monomers was demonstrated by comparisons of 9 vs. 8, and 14 vs. other tripodal alkynes (10-13). Amines are beneficial to the copper-catalyzed process because they assist in the production of Cu-acetylide intermediates and contribute to productive chelating interactions with the metal center. Indeed, the $Cu^+$ complexes of tris(triazolylamine) compounds derived from 14 are highly active catalysts in solution-phase triazole-forming reactions for organic synthesis and bioconjugation (Wang, Q.; et al. *J. Am. Chem. Soc.* 2003, 125, 3192-3193; Chan, T. R.; et al. *Org. Lett.* 2004, submitted).

The length and molecular weight distributions of condensation polymers are extremely sensitive to the functional group ratio, with longer chains being produced the closer the ratio approaches unity (Flory, P. J. In Principles of Polymer Chemistry; Cornell University Press: Ithaca, N.Y., 1953, p Chapter III). It might therefore be expected that the nature of the crosslinked adhesives produced here would also reflect this parameter. Indeed, the material formed from [4+14] was quite sensitive to functional group stoichiometry, showing far better strength at a 1:1 ratio of azides to alkynes than at a 1:1.5 ratio of functional groups. In contrast, the mixture of [1+10] was relatively insensitive to changes in the monomer ratio (FIG. 4).

Figure 5:
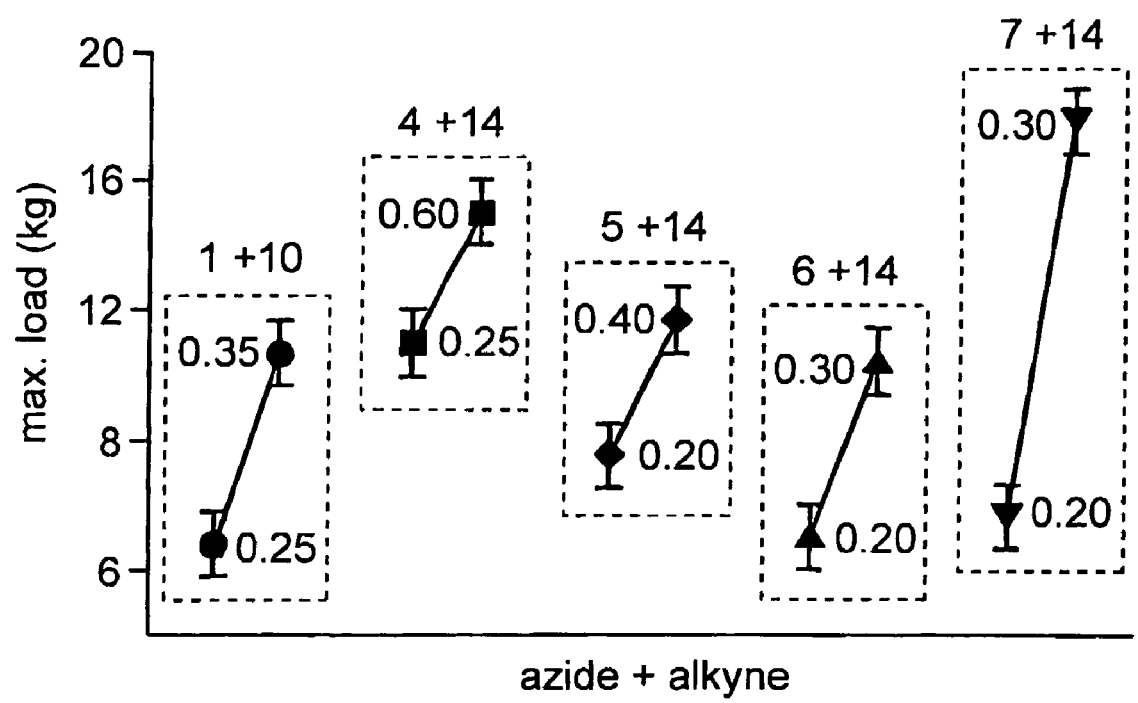
FIG. 5 is a graph showing the maximum load (kg) as a function of the amounts of monomers used.

Given equal coverage of adhered surfaces, the use of increasing amounts of elastic adhesive often results in less overall bonding strength. Such was the case with the commercial glue used for comparison testing (FIG. 4). In contrast, all five monomer combinations gave improved performance when used in larger amounts, as shown in FIG. 5. The most dramatic example was provided by 7+14: the mixture containing 0.10 mmol of each monomer on copper, supported 5.6 kg whereas the use of 50% more material (0.15 mmol of each monomer) gave nearly three times the strength (17.8 kg). The latter value represents the best performance observed in this study, between two and three times the measured strength of the commercial metal adhesive (Preliminary experiments were also performed with extra large copper plates (surface contact area of 2×2 inches=2581 mm$^2$) and 100 mg of monomer mixtures. The most effective system, supporting at least 25 kg in a peel test for at least 10 hours, was composed of a 1.5:1 mixture of 4 and 14 (azide:alkyne ratio=1:1).) Visual inspection of plates after separation by load testing revealed generally good coverage by the polytriazole adhesives, but small bare patches (not caused by peeling of adhesive from the metal surface) were observed in a few cases using lesser amounts.

Having an amine group in at least one of the monomers is often beneficial. The most striking example was provided by the greatly enhanced performance of 7 relative to 6, in use with triacetylene 14 (FIG. 5). Amines enhance the 1,3-dipolar cycloaddition process at least in part by providing a basic environment, which favors copper acetylide formation both kinetically and thermodynamically. They may also provide an important component of triazolylamine ligands for Cu(I), at least one example of which has been shown to provide enhanced catalytic efficiencies in solution-phase reactions (Wang, Q.; et al. *J. Am. Chem. Soc.* 2003, 125, 3192-3193; Speers, A. E.; et al. *J. Am. Chem. Soc.* 2003, 125, 4686-4687).

It is disclosed herein that polymers made in solution using soluble Cu(I) species retain a substantial amount of copper in the bulk of the material (unpublished results). Three representative adhesive samples ([1+8], [1+10], and [4+14]) were removed from the copper surface after separation of the plates in load testing, and analyzed for copper after dissolving the polymer in sulfuric acid. The results showed copper present at levels approximately 5-15% of the number of triazole units potentially formed in each matrix (2-5 weight-% of the adhesive mixture). Studies of bulk polymers show little change in melting properties before and after removal of copper by vigorous treatment with metal chelating agents (data not shown).

Variables such as annealing pressure, annealing time, added copper salts, and the addition of a dendrimeric poly (alkyne) were explored as well, each having a modest effect on the outcome (Experimental details are available from the authors upon request). Control experiments established that no adhesion was obtained with the monodentate azide 16 and trialkyne 10, nor with polydentate azide or alkyne alone. Copper-electroplated zinc performed analogously to solid copper, but differences in surface roughness caused larger variations (approximately ±20%) in adhesive performance. Brass, which is approximately 70% copper, was found to make an adhesive polymer with strengths that are approximately 60-90% of those reported here for pure copper.

Zinc metal surfaces do not mediate the cycloaddition reaction and therefore are not adhered to one another by these compounds in the absence of added copper. However, polytriazoles adhere to metals of various kinds, so the addition of copper ions to monomer mixtures on zinc was explored. The addition of Cu(I) or Cu(II) salts promoted the formation of adhesive materials, with Zn metal as the reducing agent to generate and preserve Cu(I) in the mixture. The observed load-bearing capacities were comparable to those of the commercial glue and in the range of many of the mixtures tested on copper (Experimental details are available from the authors upon request). The addition of Cu at 10 mol % (relative to the total number of azide or alkyne groups) made for the maximum strength in a series of experiments using 1+10, presumably due to a balancing of overall cycloaddition rate (proportional to Cu concentration) and the length of the polymer chains (inversely proportional to Cu concentration). Most striking is the fact that, with the exception of [4+10], no adhesive polymer was formed with monomers derived from pentaerythritol (4, 6, and 7), which performed well on copper metal. While the reasons for this are not yet clear, these observations suggest that structure-activity relationships depend upon the type of surface and/or the method by which the catalytic Cu(I) centers are introduced.

Experimental Section

General. Solid copper plates (1"×2") were cut from oxygen-free alloy 101 Cu bars (2"×48"×0.125", purchased from McMaster-Carr, Inc.); brass plates from alloy 260 (68.5-71.5% Cu, 28.38-31.38% Zn, 0.07% Pb, 0.05% Fe; 1"×12"×

0.125", McMaster-Carr). Zinc plates were cut from commercial carpentry mending plates of 1"×6" dimension, obtained from a local hardware store. NMR spectra were obtained at 200 MHz ($^1$H) on a Varian Mercury 200 instrument; IR spectra were obtained on a MIDAC FTIR instrument using a horizontal attenuated total reflectance (HATR) accessory (Pike Instruments). Elemental analyses were performed by Midwest Microlabs, Inc. All synthesized monomers were fully characterized and were analytically pure. The commercial glues used for comparison were Weld-It™ (Devcon®, manufactured by ITW Performance Polymers Consumer Division), Super Glue™, and Gorilla Glue™, the first being the best and therefore the one used for the majority of tests. "GAP" is GAP Polyol 5527, manufactured by MACH I® Inc., obtained and used as a 40% (w/w) solution in ethyl acetate.

Electroplating.

Initial adhesive studies were performed with copper-coated zinc made by electroplating from acidic copper sulfate solution. The metal plates used were 0.5 inches wide and 1 inch long, giving a contact area when crossed at right angles of 161 mm$^2$. These were designated as the "small" plates, and the results using these materials are described below. The main paper describes the analogous results obtained using solid copper plates (1×2 inches). These "large" plates create a contact area of 645 mm$^2$ when crossed at right angles.

Monomer Syntheses.

Compounds 8, 9, and 14 are commercially available; 16 was kindly provided by Dr. Jun-cai Meng. The following compounds are known and were prepared by the reported procedures with only slight adjustments: 2 (Trost, B. M.; Rudd, M. T. *J. Am. Chem. Soc.* 2002, 124, 4178-4179; Kang, S.-K.; et al. *J. Am. Chem. Soc.* 2000, 122, 11529-11530; Greau, S.; et al. *J. Am. Chem. Soc.* 2000, 122, 8579-8580; Yamamoto, Y.; et al. *J. Org. Chem.* 1998, 63, 9610-9611), 10 (Jarman, M.; et al. *J. Med. Chem.* 1993, 36, 4195-4200), 11, 12 (Preparation of (propargyloxy)benzene derivatives as fungicides: Place, P.; Pepin, R., (1987), FR 2598408 A11987113, CAN 108:182220), 13 (Calvo-Flores, F. G.; et al. *Org. Lett.* 2000, 2, 2499-2502), and 15 (Korostova, S. E.; et al. *Zhurnal Prikladnoki Khimii* 1990, 63, 234-237). The syntheses of monomers are summarized in FIGS. 6, 7 and 8; characterization data for new compounds follows.

N,N-Bis-(2-azidoethyl)-4-methyl-benzenesulfonamide (1)

To a suspension of bis(2-chloroethyl)amine hydrochloride (4.68 g, 26.2 mmol) in dry THF (50 mL) was added Et$_3$N (18.3 mL, 131 mmol) at 0° C. and the mixture was stirred for 15 min. p-Toluenesulfonyl chloride (5.00 g, 26.25 mmol) and DMAP (a spatula pinch) were added. The reaction mixture was allowed to warm to room temperature and was stirred overnight. When TLC analysis showed complete conversion, the mixture was filtered to remove the Et$_3$N.HCl and extracted with EtOAc. The combined organic phases were washed with brine, dried (Na$_2$SO$_4$), filtered and concentrated. The residue was purified by flash column chromatography to afford N,N-bis(2'-chloroethyl)-4-methylbenzenesulfonamide (6.22 g, 80% yield).

To a stirred solution of the above sulfonamide (6.00 g, 20.3 mmol) in EtOH:H$_2$O (1:1) (110 mL) were added NaN$_3$ (13.3 g, 20.3 mmol) at room temperature and a pinch of 18-crown-6 ether. The mixture was refluxed for 12 h, after which time the EtOH was removed under vacuum and the aqueous layer was extracted with EtOAc, washed with brine, dried (Na$_2$SO$_4$), filtered, and concentrated. The residue was purified by flash column chromatography to afford 1 (4.08 g, 65% yield) as a white solid. Mp 47-48° C.; $^1$H NMR (CDCl$_3$) δ 2.51 (s, 3H), 3.37 (t, J=6.5 Hz, 4H), 3.61 (t, J=6.0 Hz, 4H), 7.40 (d, J=8.0 Hz, 2H), 7.77 (d, J=8.0 Hz, 2H); $^{13}$C NMR (CDCl$_3$) δ 30.0, 49.4, 51.2, 127.6, 130.4, 136.1, 144.5; IR (thin film, cm$^{-1}$) 2102, 1344, 1302, 1163; MS m/z (relative intensity) 432 (M+Na)$^+$ (100). HRMS calcd for C$_{11}$H$_{16}$N$_7$O$_2$S 310.1086, found 310.1089.

2,2-Bis-azidomethyl-propane-1,3-diol (4)

To a 1 L round-bottomed flask equipped with a stirbar and condenser were added 2,2-bis(bromomethyl)-1,3-propanediol (100 g, 0.38 mol), sodium azide (60 g, 0.92 mol) and DMSO (200 mL). The mixture was heated at 100° C. for 36 h, cooled, and water (300 mL) and brine (100 mL) were added. The mixture was extracted five times with EtOAc, and the combined organic phases were washed with brine, dried (Na$_2$SO$_4$), filtered, concentrated. The final traces of solvent were removed under vacuum to yield 4 (64 g, 90% yield) as slightly yellow oil. $^1$H NMR (CDCl$_3$) δ 2.65 (br s, 2H), 3.48 (s, 4H), 3.68 (s, 4H); $^{13}$C NMR (CDCl$_3$) δ 45.2, 52.1, 63.9; IR (thin film, cm$^{-1}$) 3369, 2934, 2088, 1292, 930; MS m/z (relative intensity) 209 (M+Na)$^+$ (100). HRMS calcd for C$_5$H$_{11}$N$_6$O$_2$ 187.0943, found 187.0946.

N,N',N"-Tris-(3'-azidopropyl)-[1,3,5]triazine-2,4,6-triamine (5)

To a solution of 3-chloropropylamine hydrochloride (40 g, 0.31 mol) in H$_2$O (280 mL) at room temperature was added NaN$_3$ (100 g, 1.54 mol) and a pinch of KI. The reaction mixture was stirred for 72 h at 90° C. The reaction was cooled to room temperature and NaOH (pellet) was added until ca. pH=11. Solid NaCl was then added and the mixture was extracted five times with toluene. The combined organic layers were dried (Na$_2$SO$_4$), filtered, and the solvent was partially evaporated, slowly and carefully, under vacuum in the rotary evaporator at low temperature. The concentration of 3-azidopropylamine in the resulting toluene solution was measured by integration of the $^1$H NMR spectrum (ca. 0.6-1.4M). Caution! Small organic azides should never be distilled to dryness.

To a solution of cyanuric chloride (10 g, 54.2 mmol) in THF (150 mL) at 0° C. were added diisopropylethylamine (31 mL, 176.18 mmol) in THF (50 mL) and 3-azidopropylamine (128 mL, 1.4 M in toluene, 178.86 mmol). The reaction mixture was stirred under reflux for 50 h. The solvent was then carefully evaporated to the minimum residue, which was extracted with EtOAc. The combined organic layers were washed with brine, dried (Na$_2$SO$_4$), filtered, concentrated, and purified by flash column chromatography to yield 5 (16.68 g, 82% yield) as slightly yellow gummy syrup. $^1$H NMR (CDCl$_3$) δ 1.31 (m, 6H), 1.89 (m, 6H), 3.43 (m, 6H), 3.51 (br s, 3H); $^{13}$C NMR (CDCl$_3$) δ 30.0, 38.3, 49.5, 171.6; IR (thin film, cm$^{-1}$) 2137, 2061, 1288, 869; MS m/z (relative intensity) 377 (M+2)$^+$ (20), 376 (M+1)$^+$ (100), 130 (100). HRMS calcd for C$_{12}$H$_{22}$N$_{15}$ 376.2177, found 376.2179.

2,2,2-Tris(azidomethyl)ethanol (6)

Pentaerythritol was converted to the trichloride by the literature procedure (Lynch, K. M.; Dailey, W. P. *J. Org. Chem.* 1995, 60, 4666-4668). This intermediate constituted 94% of the crude reaction mixture (analyzed by gas chromatography) and was purified by recrystallization from hexanes. The trichloride was dissolved in DMF, treated with 3.3 equivalents NaN₃, and heated at 120° C. for 17 h. The crude reaction mixture was cooled, an equivalent volume of water was added, the organic product was extracted into toluene, and DMF was back-extracted into water. The organic solution was dried (MgSO$_4$) and used as obtained; the concentration of 6 was determined by NMR. Caution! Small organic azides should never be distilled to dryness.

Tris(azidomethyl)aminomethane (7)

Tris(hydroxymethyl)aminomethane was converted to the trichloride ammonium salt as previously described (Martinu, T.; Dailey, W. P. *J. Org. Chem.* 2000, 65, 6784-6786). This intermediate (8.4 g, 40 mmol) was dissolved in water, treated with 4 equivalents NaN$_3$, and heated to reflux. The condenser was connected to a trap filled with solid NaOH to remove any traces of HN$_3$ that may have been formed. After 17 h, the mixture was treated with a small amount of 1M aqueous NaOH to quench any acid, and was then extracted into toluene. The organic solution was dried (MgSO$_4$) and used as obtained; the concentration of 7 was determined by NMR. Caution! Small organic azides should never be distilled to dryness.

5-Dimethylamino-naphthalene-1-sulfonic acid bis-(2'-azidoethyl)-amide (17)

The same procedure used above to obtain 1 from tosyl chloride was applied to dansyl chloride, yielding 17 in 52% overall yield as a yellow solid. The use of this compound is described below. Mp 45-46° C.; $^1$H NMR (CDCl$_3$) δ 2.25 (s, 4H), 2.97 (s, 6H), 3.55 (dd, J=13.7, 5.2 Hz, 4H), 7.28 (d, J=7.4 Hz 1H), 7.51-7.71 (m, 2H), 8.27 (d, J=7.3 Hz, 1H), 8.35 (d, J=8.7 Hz, 1H), 8.65 (d, J=8.5 Hz, 1H); $^{13}$C NMR (CDCl$_3$) δ 45.8, 48.3, 50.9, 115.9, 119.4, 123.5, 128.9, 130.2, 130.4, 130.6, 131.4, 134.5, 152.4; IR (thin film, cm$^{-1}$) 2173, 2057, 1243, 905; MS m/z (relative intensity) 411 (M+Na)$^+$ (10), 390 (M+2)$^+$ (9), 389 (M+1)$^+$ (58), 130 (100). HRMS calcd for C$_{16}$H$_{21}$N$_8$O$_2$S 389.1503, found 389.1510.

Experimental Procedure for Copper Adhesives.

Each copper plate was constructed with a drilled hole on each end to facilitate the hanging of weights for load testing. The copper plates were cleaned just before use by brief exposure to H$_2$SO$_4$, followed by thorough rinsing with water, ethanol, and acetone; zinc was cleaned with organic solvent. As described above, monomers were mixed in concentrated stock solutions using the minimum necessary amount of THF (usually approximately 0.5 M in each monomer). The required amount of stock mixture was then deposited at the center of each plate, and the mixture was manually spread over the relevant region of the plate while the solvent evaporated. The two plates were then crossed at right angles to bring the treated surfaces in contact with each other, and rested flat under a 25-lb weight for the indicated period. The contact area was therefore 1 in$^2$ (approximately 650 mm$^2$). If GAP was used (see below), the polymer in ethyl acetate was first applied to the two surfaces, the metal pieces were allowed to dry, and then the above procedure was performed with the monomers of choice.

Load testing was performed by attaching one plate to a chain extending over a support rod, and the other to a chain on which weights could be hung. Weight was added in 1-lb increments and allowed to hang from the assembly for one minute, after which the weight was increased. Care was taken to introduce the load at each increment without imposing a sharp stress on the apparatus. Failure of the adhesive was reached when the plates separated within one minute of the load being applied. This can be regarded as a simple "peel"-type test, and was chosen because highly reproducible results were obtained. Shear-type testing gave much greater apparent strengths, but was less reproducible. For example, a shear test on a mixture of 1+10 supported a maximum load of 31 kg, compared to 4.8 kg in the peel test. The results represented in FIG. 4 are listed in FIG. 9. In that table are also listed "normalized" values of adhesive strength (maximum load sustained per gram of adhesive). While not discussed above, this offers a different way to compare adhesive mixtures to each other.

Use of Polymeric Azide Additive.

A parallel set of experiments was performed by pretreating of the metal surfaces with a polymer containing side-chain azides ("glycidyl azide polymer", GAP, a commercially-available product of azide substitution on the ring-opening polymer of glycidyl chloride). The purpose was to increase crosslinking at the metal interface, perhaps providing greater adhesive power. While the general observed trend was toward better adhesive properties (FIG. 4, FIG. 9), the effect of GAP was not dramatic and no structure-activity trends were changed with its use.

Dansyl diazide 17 (FIG. 8) was used with 1 to test the relative effectiveness of mixtures of monomers (i.e., more than one azide or alkyne) when compared to standard pair-wise compositions; entries 23-24 show that no difference in adhesive performance was realized. When alkyne 10 was used with GAP and no additional azide, a moderately strong adhesive was produced (entry 27), showing that the side-chain azide polymer can be stitched together into a networked structure with only a multivalent alkyne. When two standard runs were annealed at 60° C. instead of room temperature, little difference in the strength of the resulting material was observed (data not shown).

Linear Polymers Made in Solution

Bifunctional monomers 1 and 2 were condensed in 1:1 t-BuOH:H$_2$O (0.3 M in each monomer) at room temperature for 10 hours in the presence of 5% CuSO$_4$ and 10% sodium ascorbate. The solvent was poured off, leaving a gummy solid which was washed sequentially with water, methanol, chloroform, THF (3×), and dried under vacuum. A small portion was removed by scraping (designated 3a). The remainder was dissolved in hot DMSO and precipitated by the addition of methanol. The resulting solid was collected and washed again with water, methanol, chloroform, and THF (designated 3b). This latter material represented the major component of the mixture, approximately 70%, and was insoluble in a wide selection of solvents other than hot DMSO. Spectroscopic data (IR and NMR) were consistent with the presence of relatively short chains (unreacted azide and alkyne being sensitively detected by their overlapping signatures at ca. 2100 cm$^{-1}$ in the infrared), but neither sample was sufficiently soluble for GPC analysis.

DETAILED DESCRIPTION OF FIGURES

FIG. 1 shows the copper-catalyzed [3+2]cycloaddition of the diazide 1 with the dialkyne 2 to give a linear polymer represented by structure 3. This polymer was found to be DMSO soluble with a broad molecular weight distribution which extended up to (1)$_{23}$(2)$_{22}$ (m/z=12,565).

FIG. 2 shows a series of events leading to adhesion to copper by the formation of networked triazoles: (A) azide and alkyne monomers in the presence of Cu(I) ions generated from, and/or stabilized by, the copper(0) surface; (B) Cu-mediated cycloaddition near the metal surface, where Cu(I) concentration is presumed to be highest; (C) completion of the crosslinking by triazole formation through the bulk of the polymer; potential copper-acetylide and copper-triazole interactions are also represented.

Figure 3:
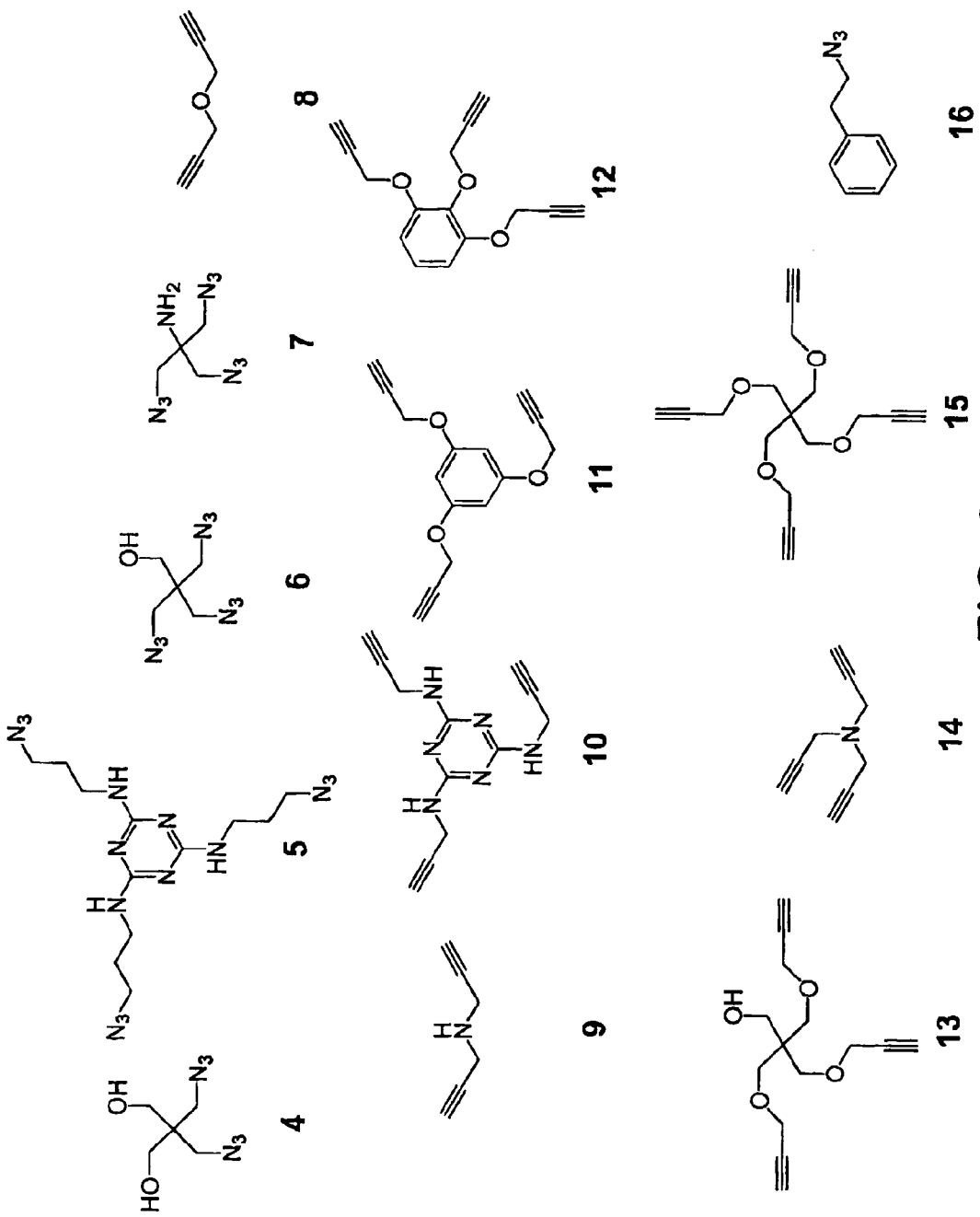
FIG. 3 shows the structures of the selected alkynes and azides that were tested for the ability to form adhesive polymers.

FIG. 3 shows the structures of the selected alkynes and azides that were tested for the ability to form adhesive polymers.

FIG. 4 is a three-dimensional chart summarizing the results of the combinations of the different polymers tested. Maximum loads supported by the adhesives made from the indicated mixture of monomers are shown on the z-axis of the graph, at 0.1 mmol scale in the alkyne. The observed trends are very similar for adhesives made with and without precoating with GAP polymer. Rows marked with boxed designations of alkyne (10 and 14) denote the use of a 1:1.5 ratio of total azide groups to alkyne groups in the mixture. Under the three-dimensional plots are shown projections along the alkyne and azide axes.

FIG. 5 is a graph showing the maximum load (kg) as a function of the amounts of monomers used. The value beside each point is the total mmoles of the combined monomers; each reaction contains an equimolar ratio of azide and alkyne groups. Adhesive layer thicknesses were approximately 20-100 microns.

Figure 6:
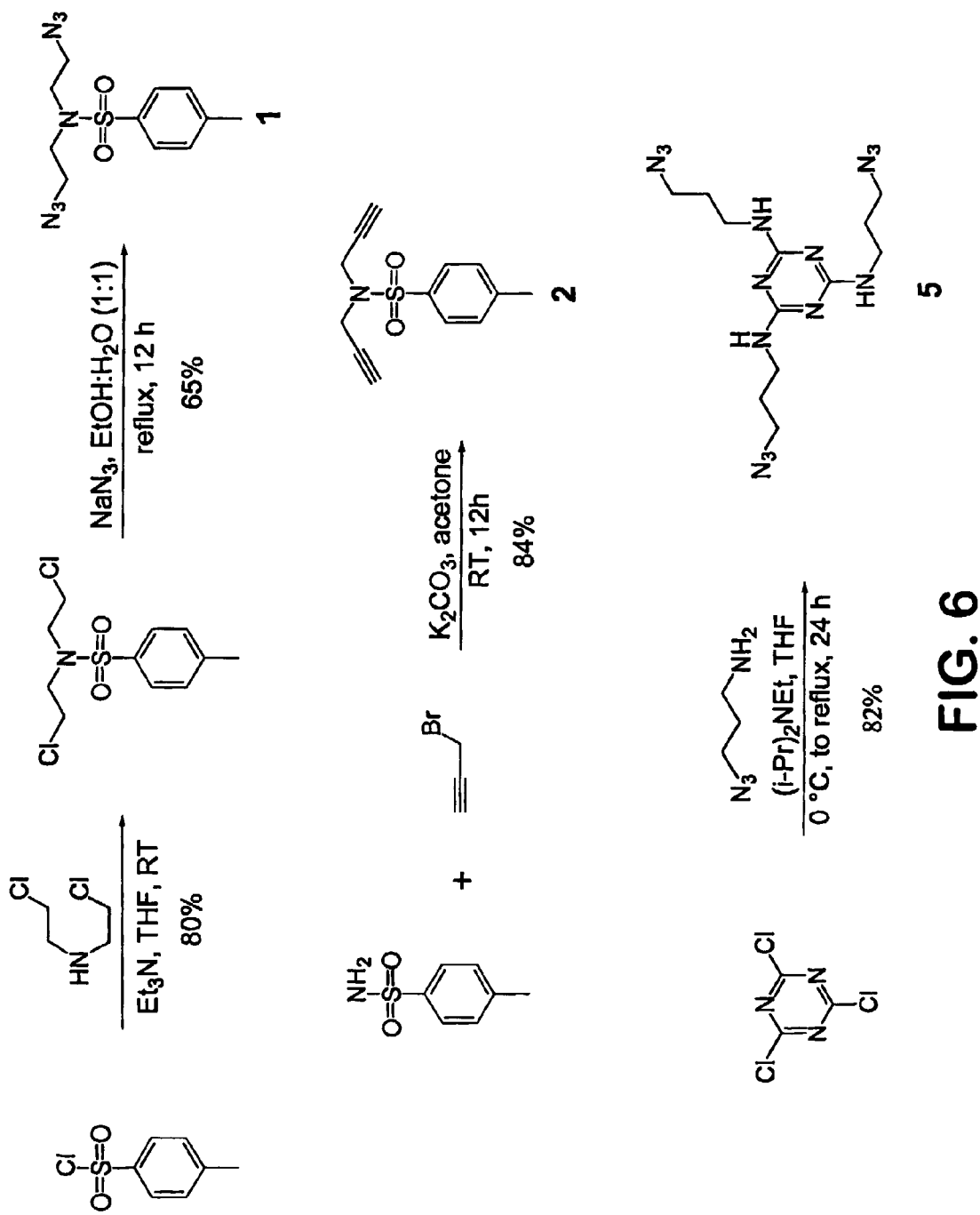
FIG. 6 is a series of schemes showing the synthesis of the monomers used in the adhesives test.

FIG. 6 is a series of schemes showing the synthesis of the monomers used in the adhesives test. The first reaction to make 1 is an N-sulfonylation of the nitrogen mustard, N,N-di(2-chloroethyl) amine, followed by an $S_N2$ displacement of the chlorides to obtain the diazide, 1. The second reaction is an N-propargylation of 4-methyl-benzenesulfonamide under mild conditions to give the diacetylene, 2. The last reaction is the displacement of the chlorides of cyanuric chloride with 3-azidopropylamine to give the triamino-1,3,5-triazine 5.

Figure 7:
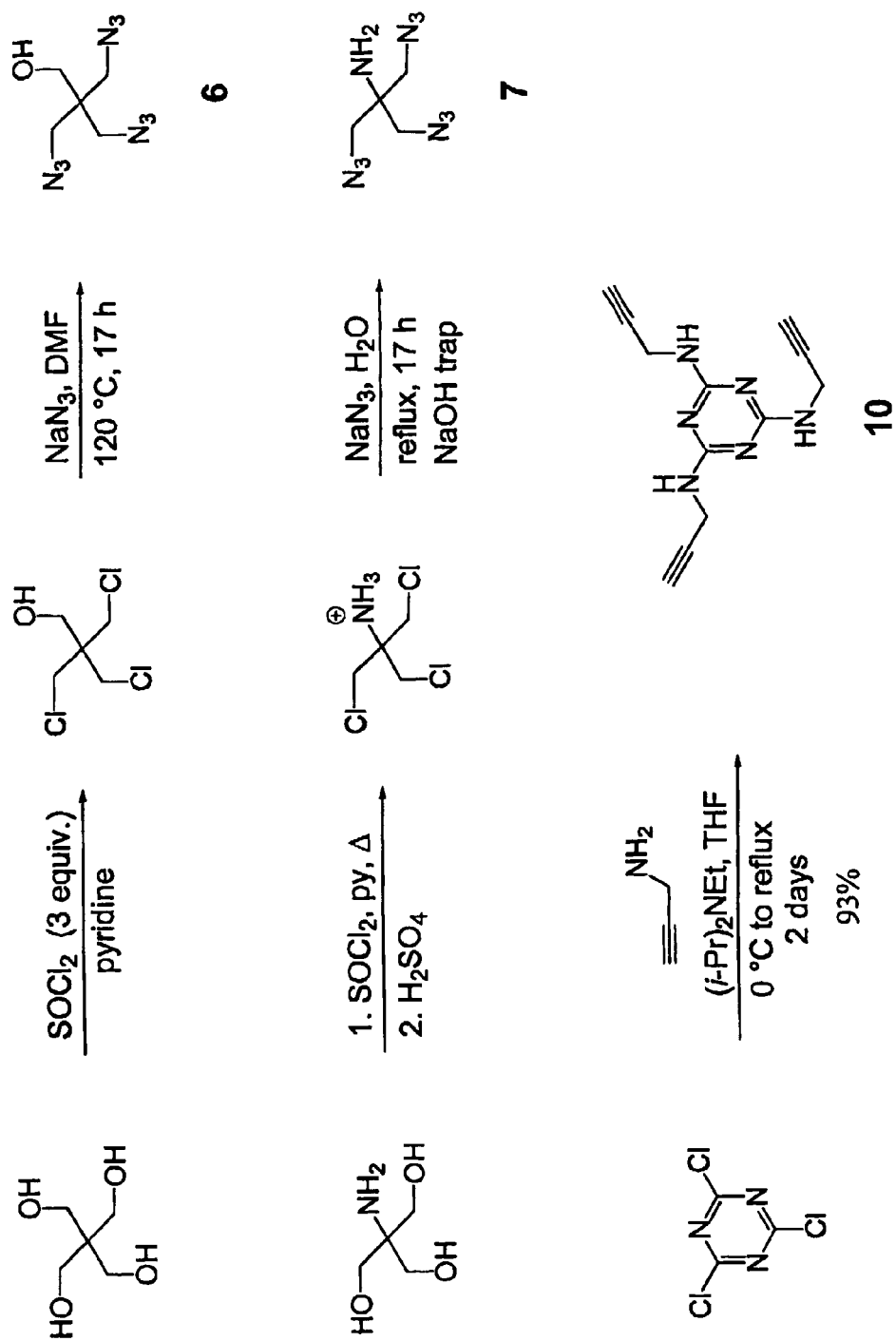
FIG. 7 is a series of reactions showing the synthesis of the monomers used in the adhesives tests.

FIG. 7 is a series of reactions showing the synthesis of the monomers used in the adhesives tests. The formation of 6 starts with the displacement of three hydroxyl groups of pentaerythritol to give the trichloro intermediate. $S_N2$ displacement of the chlorides by the nucleophilic azide anion gives the triazide 6. A similar sequence is used to synthesize 7. The triacetylene, 10 is obtained by displacing the three chlorides of cyanuric acid under mild conditions by propargylamine.

Figure 8:
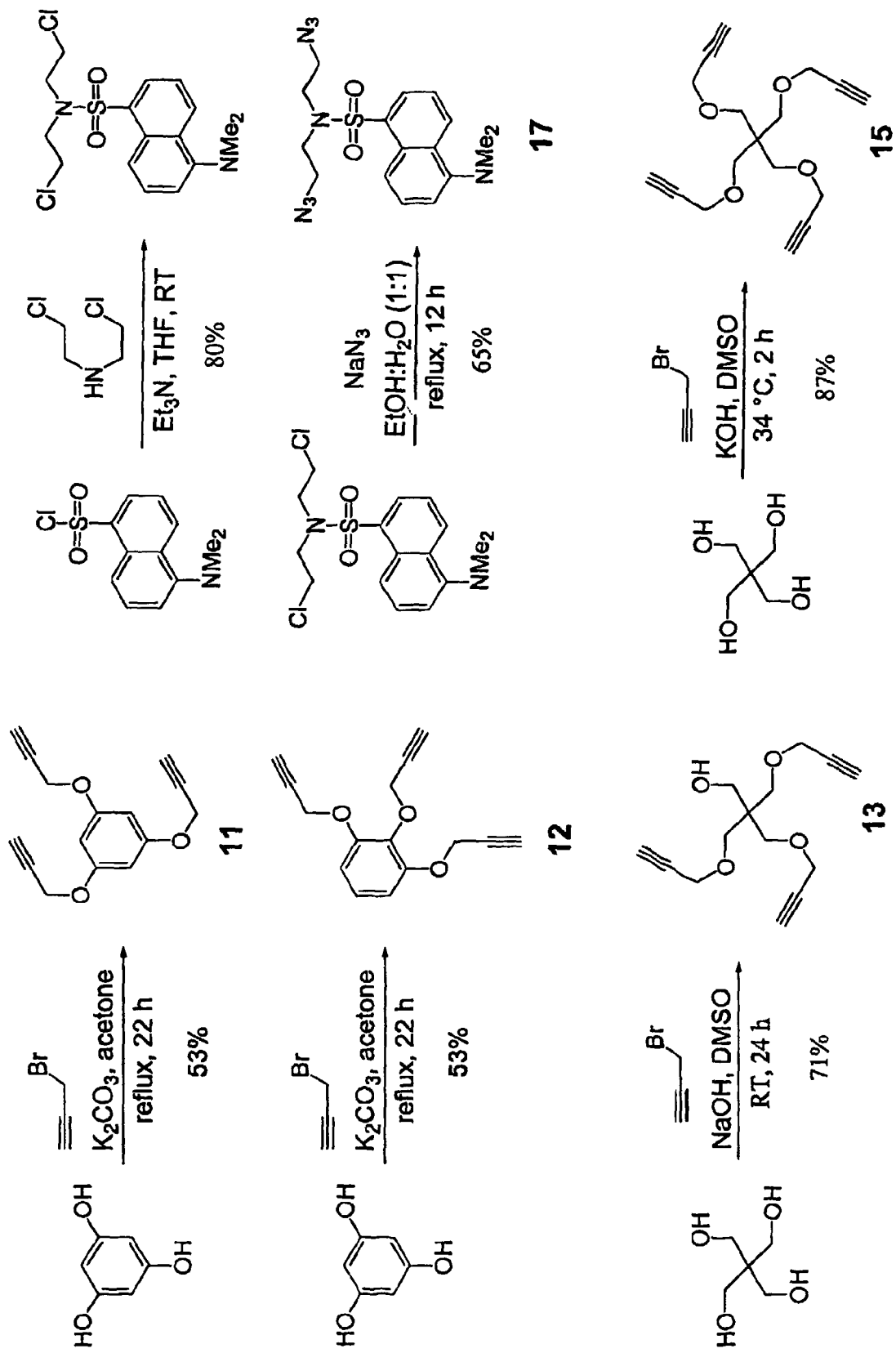
FIG. 8 is a series of reactions showing the synthesis of the monomers used in the adhesives tests.

FIG. 8 is a series of reactions showing the synthesis of the monomers used in the adhesives tests. These reactions use the Williamson ether synthesis to form propargyl ethers with either 1,3,5-trihydroxybenzene, pyrogallol or pentaerythritol under mild conditions.

FIG. 9 is a table of the starting monomers, ratio of reagents and strength of the resulting adhesive as measured. Conditions: A mixture of 0.1 mmol of the alkyne-containing monomer and either 0.1 or 0.15 mmol of the azide component in a minimum amount of THF was distributed as evenly as possible by pipette over the intersecting region of the two "large" copper plates. After the solvent was allowed to evaporate, the plates were pressed together with 11.4 kg of force for 2 days at room temperature. All values reported are the average of at least two independent experiments of three replicates each, with an error between experiments of ±1 kg. Note that experiments involving Weld-It® adhesive were less reproducible, with an error of ±3 kg. (a) Ratio of azide groups to alkyne groups. (b) Maximum load supported by the plates for one minute. (c) Values in brackets were obtained with the use of GAP as described above. (d) "Weld-It®", manufactured by Devcon, Inc.

It was noted earlier that the relatively poor performance of materials made from diazides and dialkynes. This was reinforced with the use of dansyl diazide 17 (FIG. 9, entry 3). Replacing the dialkyne component with a trialkyne results in stronger adhesives (entries 5-11 vs. 2). Thus, when used in equimolar amounts with 1 (making for a 1:1.5 ratio of azides to alkyne groups), 10-12 gave strong but not outstanding glues, with 10 appearing somewhat weaker (entries 5, 7, 8). The flexible tri(alkyne) 13 produced a poorer adhesive (entry 9), but the capping of the remaining hydroxyl to give the tetraalkyne 15 restored the desired function (entry 12). Structure 12 might be expected to form more rings, and thus shorter chains, than isomer 11; the fact that these monomers exhibit similar performance suggests that ring formation is not as important a consideration as structural rigidity (highlighted by the comparison of 13 with the other tri(alkynes)). The combination of tripropargylamine (14) with pentaerythritol-derived diazide 4 showed the same level of adhesive strength in a 1:1.5 azide:alkyne ratio, but improved dramatically when the ratio was adjusted to 1:1 (entries 10, 11).

The substitution of triazide 5 for diazide 1 in reactions with trialkynes gave little or no improvement in the adhesive power of the material. The same general trends with structure of the alkyne component were observed when paired with 5: dialkyne 8 was poor (entry 14; but note that the more rigid 2 was better, entry 13) and 10-12 good (entries 15-17). Some differences can also be noted, for example, 13 was not much worse than 10-12 (entry 18), and tetraalkyne 15 not substantially better (entry 22). Trialkyne 14 again emerged as superior (entry 19 vs. 15-18), but its use with triazide 5 was not as good as with diazide 4 (entry 19 vs. 11). This shows that factors other than monomer branching can be important; presumably, there is a difference in the nature of the polymerization reaction itself with 5 vs. 4 that remains to be uncovered. The dramatic improvements observed with triazides 6 and 7, relative to 5, are addressed in the text.

Note that the combination of diazide 4 with dialkyne 9 provides a four-fold increase in adhesive power relative to the other "linear" systems, and better than a five-fold improvement on a per-gram basis (entry 4 vs. 2-3). The presence of an amino group in monomer 9 is likely to be at least partially responsible. Structures such as bis(triazolyl)amine 18 could contribute by providing both a means to crosslink chains and a more active copper catalytic center. We have previously observed in standard (i.e., non-polymeric) reactions that bis(triazolyl) structures lacking the central coordinating nitrogen atom are poorer ligands for copper and provide poorer cycloaddition catalysis than bis- and tris(triazolyl)amine structures.

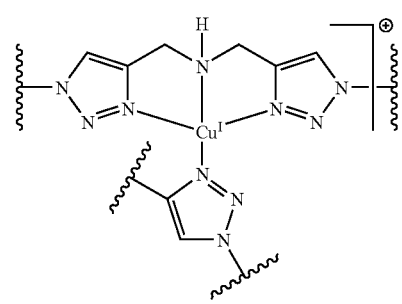

18

Entries 23 and 24 demonstrate that mixtures of monomers created no stronger adhesives than the corresponding monomer pairs. The control experiments (entries 25-28) were mostly described in the text. When alkyne 10 was used with GAP and no additional azide, a moderately strong adhesive was produced (entry 27), showing that the side-chain azide polymer can be stitched together into a networked structure with only a multivalent alkyne. When two standard runs were annealed at 60° C. instead of room temperature, little difference in the strength of the resulting material was observed (data not shown).

FIG. 10 is a table that shows the calculation of kg load per g adhesive values shown in FIG. 9. The experiments performed with GAP are not shown here.

FIG. 11 is a table that summarizes the preliminary measurements of adhesive strength for zinc plates. (a) Cu (I) was dissolved in acetonitrile; $CuSO_4.5H_2O$ and hydroquinone were dissolved in water before mixing with the monomers. (b) Determined by three independent replicates; ±1 kg, except for entries 1a-d, which is ±3 kg. A value of zero indicates that no adhesive was formed. (c) Determined as in FIG. 9.

FIG. 12 is a table that summarizes the kg load per g adhesive results for zinc plates. (a) Cu (I) (cuprous iodide) was dissolved in acetonitrile; $CuSO_4.5H_2O$ and hydroquinone were dissolved in water before mixing with the monomers. (b) Determined by three independent replicates; ±1 kg, except for entries 1a-d, which is ±3 kg. A value of zero indicates that no adhesive was formed. (c) Determined as in FIG. 10.

FIG. 13 is a table that shows the maximum load as a function of amounts of monomers used. (a) "mmol monomers" is the total of both monomers in the mixture; "ratio" is the ratio of total alkyne groups to azide groups. Thus, the first row reports a mixture of 0.10 mmol diazide 1 and 0.10 mmol trialkyne 10. (b) Determined as in FIG. 10; runs with GAP were not calculated.

FIG. 14 is a table showing experiments where additives were incorporated. Conditions and table notations are the same as described in FIG. 9. (a) Entries marked with asterisks are taken from FIG. 9, repeated here for convenience. (b) The salts were pre-mixed before introduction to the monomer mixture. (c) A $3^{rd}$-generation benzylic ether (Fréchet-type) dendrimer bearing 24 terminal alkyne groups at the periphery, kindly provided by Dr. Craig Hawker of IBM, and used to provide 5% of the total alkyne groups.

FIG. 15 is two charts showing the dependence of adhesive strength on the indicated variables. (a) monomers 1+10 (0.05 mmol each) used with GAP as described, incubated with the indicated pressure for two days prior to load testing. (c) 1+10 (0.1 mmol each) in THF, used with GAP, large Cu plates; incubated under 11.4 kg pressure for the indicated time prior to load testing.

Variations in the annealing pressure and annealing time were briefly examined. Increasing the pressure under which the two metal plates are forced to anneal modestly enhanced the creation of a networked polymer adhesive (a). FIG. 15b shows that the performance of a test mixture reached a maximum after 4 days of incubation, and steadily diminished after that time. The commercial glue employed for comparison showed a steady decline in strength over the course of the eight-day experiment (data not shown). It is possible that the creation of more than an optimal number of crosslinks leads to a network that is too brittle to function as an effective adhesive. Good adhesion may also be obtained by heating the copper plates to 100° C. on a hotplate without additional pressure (data not shown).

FIG. 16 is a table comparing the copper content of adhesive mixtures. The following procedure was performed on adhered plates from the following runs: (A) 0.1 mmol 1±0.1 mmol 8 (Table S1, entry 2); (B) 0.15 mmol 1+0.1 mmol 10 (Table S1, entry 6); (C) 0.15 mmol 4+0.1 mmol 14 (Table S1, entry 11); (D) two copper plates with no monomers deposited. After polymerization and measurement of adhesive strength, the two copper plates for each sample were immersed completely for 15 minutes in a measured amount of conc. $H_2SO_4$, which had been previously found to dissolve the polymers. Following this treatment, the copper plates were removed and the resulting solutions were diluted in water and analyzed for copper content with a Varian Vista Pro ICP-AES instrument, using standards prepared in the same medium. The following values were obtained: (A) 0.037±0.004 mmol Cu; (B) 0.031±0.003 mmol; (C) 0.021±0.003 mmol; (D) 0.0060±0.0006 mmol. Subtracting the adventitious copper leached from the plates themselves [sample (D)], the amounts of copper entrained in each polymer can be expressed as a ratio to the total number of triazole groups that could be formed if the azide-alkyne cycloaddition were complete.

FIG. 17 is two graphs showing the amount of copper contained within the adhesive polymer vs. adhesive strength (left) and adhesive strength per unit weight adhesive (right).

Figure 18:
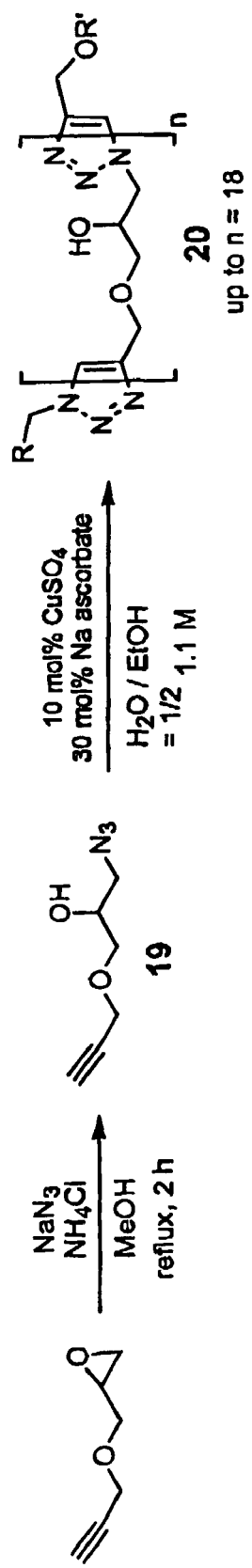
FIG. 18 is a reaction showing the synthesis of a linear polymer from a single monomer which is self-reactive.

FIG. 18 is a reaction showing the synthesis of a linear polymer from a single monomer which is self-reactive. Synthesis of rac-1-azido-3-prop-2-ynyloxy-propan-2-ol (19). 1.00 g (8.9 mmol, 1.0 equiv) rac-glycidylpropargylether, 1.16 g (17.8 mmol, 2.0 equiv) sodium azide and 0.95 (17.8 mmol, 2.0 equiv) ammonium chloride were dissolved in 4.5 mL methanol and the reaction mixture was heated to reflux. After 2 h, the reaction was finished as shown by thin layer chromatography. The mixture was cooled to room temperature and the solvent was removed under reduced pressure. The residue was partitioned between water and ethyl acetate, and the aqueous phase was extracted twice more with ethyl acetate. The combined organic phases were washed with water and brine, dried over $MgSO_4$, and evaporated. The crude product was purified by chromatography over a short silica gel column, eluting with hexane and ethyl acetate (1/1). The fractions were combined and solvent was removed to yield 277 mg (20%) of 19 as a colorless oil. $^1$H-NMR (500 MHz, $CDCl_3$) δ 4.18 (d, J=2.2 Hz, 2H, CC—$CH_2$—O), 3.97-3.93 (m, 1H, —CH(OH)—), 3.60-3.53 (m, 2H, —$CH_2$—$N_3$), 3.39-3.35 (m, 2H, —O—$CH_2$—CH), 2.45 (t, br, J=2.2 Hz, 2H, HCC—, CH(OH)—)

What is claimed is:

1. A process for forming an adhesive polymer coating on a solid surface, the process comprising the following steps:
    Step A: applying a mixture of multivalent monomers onto the solid surface, the mixture of multivalent monomers including both monomers having multiple azide functionalities and monomers having multiple terminal alkyne functionalities; and then
    Step B: catalyzing a polymerization of the monomers having multivalent azide functionalities with the monomers having multivalent terminal alkyne functionalities for forming the adhesive polymer coating on the solid surface.

2. A process according to claim 1 wherein:
    in said Step B, the polymerization of the monomers is catalyzed by $Cu^+$.

3. A process according to claim 2 wherein the solid surface includes copper and
    in said Step B, the $Cu^+$ originates from the solid surface.

4. A process according to claim 3 wherein the solid surface is copper.

5. A process according to claim 3 wherein the solid surface is an alloy containing copper wherein copper makes up the majority of the metal in the alloy.

6. A process according to claim 3 wherein the copper alloy is brass.

7. A process according to claim 3 wherein the solid surface has a copper plating.

8. A process according to claim 2 wherein the solid surface includes a reducing agent and in said Step A, the mixture also includes a source of copper salt that potentially includes $Cu^{++}$; and in said Step B, the $Cu^+$ originates, at least in part, from a reduction of the $Cu^{++}$ of said Step A by the reducing agent of the solid surface.

9. A process according to claim 8 wherein:

in said Step A, the reducing agent of the solid surface is a metal capable of reducing $Cu^{++}$ to $Cu^+$.

10. A process according to claim 9 wherein:

in said Step A, the metal is selected from the group consisting of copper, zinc, iron, aluminum, and magnesium or alloys of copper, zinc, iron, aluminum, and magnesium.

11. A process according to claim 8 wherein:

in said Step A, the copper salt is 10 mol % relative to at least one of the multivalent monomers.

12. A process according to claim 1 wherein:

in said Step A, the multivalent monomers are each independently represented by Formula I:

R-[Core]-(X-RG)$_n$;     (Formula I)

wherein:

"Core" is a multiradical core and is selected from the group of multiradicals consisting of aliphatic, aryl, heteroaryl, amine, alkenyl, ether, carbonate, carbamate, sulfonyl, sulfate, thioether, selenyl ether, and urea;

R is a functionality that binds to metal ions or to metal surfaces and is absent or selected from the group radicals consisting of amine, heteroaryl, carboxylate, sulfate, thiol, and hydroxyl;

RG is a functionality and is selected from the group consisting of azide and terminal alkyne; and X is a linker for linking RG to the "Core" and is optionally absent or selected from the group of diradicals consisting of alkyl(C1-C20), alkenyl, alkynyl, alkoxy, alkylthio, alkylamine; aryl, heteroaryl, and heteroaromatic; and "n" is 2 or greater.

13. A process according to claim 12 wherein the monomers have the following structures:

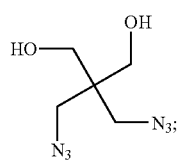

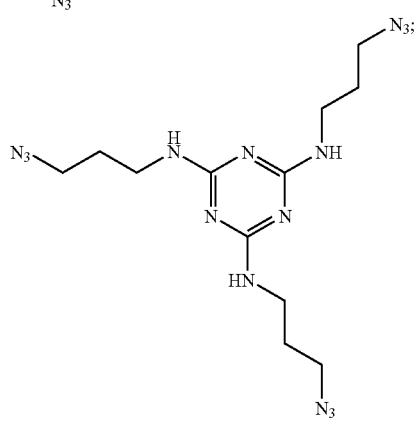

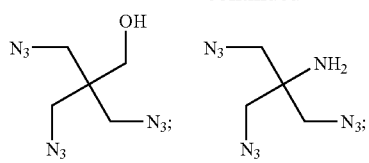

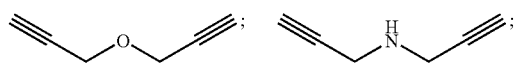

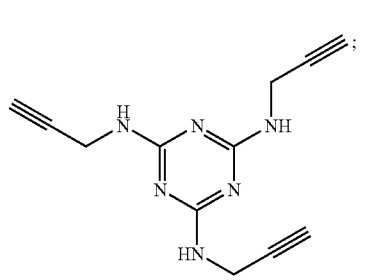

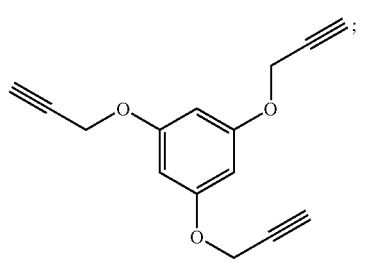

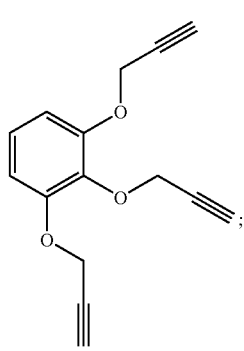

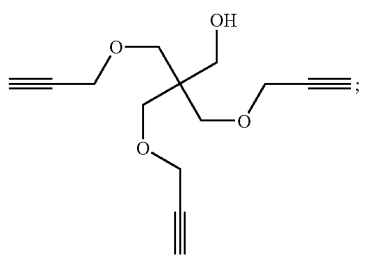

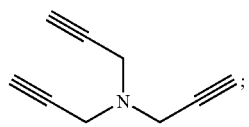

-continued

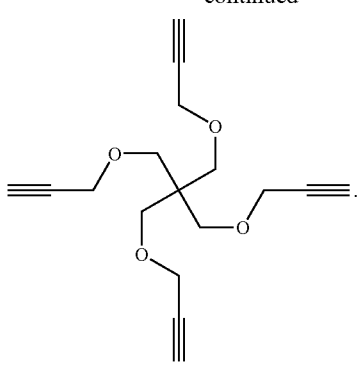

14. A process according to claim 13 wherein the preferred monomers have the following structures:

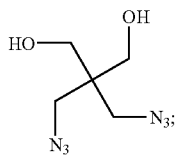

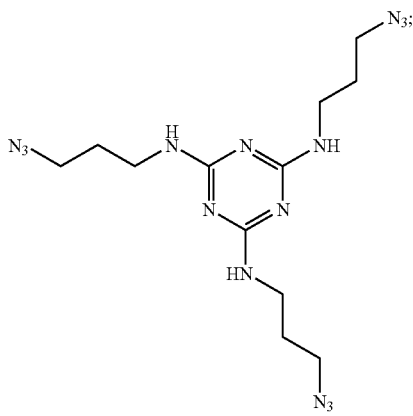

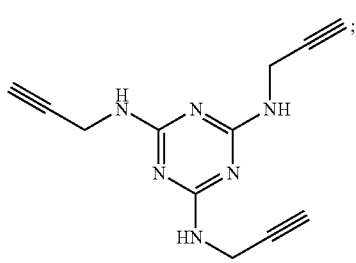

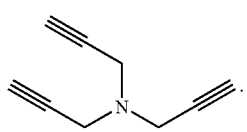

15. A method according to claim 14 wherein the preferred monomers have the following structures:

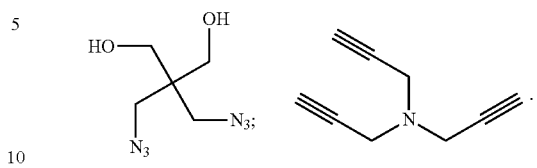

16. A process according to claim 1 wherein:
in said Step A, the mixture of multivalent monomers are applied onto the solid surface by
Substep A(1): forming the mixture by dissolving the multivalent monomers in an organic solvent;
Substep A(2): distributing the mixture in a uniform manner on the cleaned solid; and
Substep A(3): allowing the organic solvent to evaporate from the distributed mixture.

17. A process according to claim 8 wherein:
in said Step A, the mixture of multivalent monomers are applied onto the solid surface by
Substep A(1): forming the mixture by dissolving the multivalent monomers in an organic solvent together with a copper salt;
Substep A(2): distributing the mixture in a uniform manner on the cleaned solid; and
Substep A(3): allowing the organic solvent to evaporate from the distributed mixture.

18. An adhesive polymer coating formed on a solid surface according to claim 1.

19. A process for forming an adhesive polymer cement between two or more solid surfaces, the process comprising the following steps:
Step A: applying a mixture of multivalent monomers between the solid surfaces, the mixture of multivalent monomers including both monomers having multiple azide functionalities and monomers having multiple terminal alkyne functionalities; and then
Step B: catalyzing a polymerization of the monomers having multivalent azide functionalities with the monomers having multivalent terminal alkyne functionalities for forming the adhesive polymer cement between the solid surfaces.

20. A process according to claim 19 wherein:
in said Step B, the polymerization of the monomers is catalyzed by $Cu^+$.

21. A process according to claim 20 wherein at least one of the solid surfaces includes copper and
in said Step B, the $Cu^+$ originates, at least in part, from the copper solid surface.

22. A process according to claim 21 wherein both of the solid surfaces are copper.

23. A process according to claim 21 wherein the solid surfaces are an alloy containing copper wherein copper makes up the majority of the metal in the alloy.

24. A process according to claim 21 wherein the copper alloy is brass.

25. A process according to claim 21 wherein the solid surfaces have a copper plating.

26. A process according to claim 20 wherein the solid surfaces include a reducing agent and
in said Step A, the mixture also includes a source of copper salt that potentially includes $Cu^{++}$; and in said Step B, the Cu⁺ originates, at least in part, from a reduction of the Cu⁺⁺ of said Step A by the reducing agent of the solid surfaces.

27. A process according to claim 26 wherein:
in said Step A, the reducing agent of the solid surface is a metal capable of reducing Cu⁺⁺ to Cu⁺.

28. A process according to claim 27 wherein:
in said Step A, the metal is selected from the group consisting of copper, zinc, iron, aluminum, and magnesium or alloys of copper, zinc, iron, aluminum, and magnesium.

29. A process according to claim 26 wherein:
in said Step A, the copper salt is 10 mol % relative to at least one of the multivalent monomers.

30. A process according to claim 19 wherein:
in said Step A, the multivalent monomers are each independently represented by Formula I:

R-[Core]·˙X-RG)$_n$;  (Formula I)

wherein:
"Core" is a multiradical core and is selected from the group of multiradicals consisting of aliphatic, aryl, heteroaryl, amine, alkenyl, ether, carbonate, carbamate, sulfonyl, sulfate, thioether, selenyl ether, and urea;

R is a functionality that binds to metal ions or to metal surfaces and is absent or selected from the group radicals consisting of amine, heteroaryl, carboxylate, sulfate, thiol, and hydroxyl;

RG is a functionality and is selected from the group consisting of azide and terminal alkyne; and X is a linker for linking RG to the "Core" and is optionally absent or selected from the group of diradicals consisting of alkyl(C1-C20), alkenyl, alkynyl, alkoxy, alkylthio, alkylamine; aryl, heteroaryl, and heteroaromatic; and "n" is 2 or greater.

31. A process according to claim 30 wherein the monomers have the following structures:

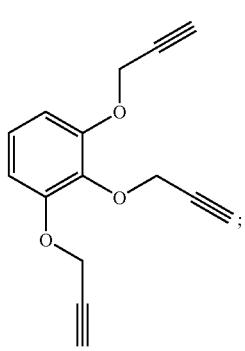

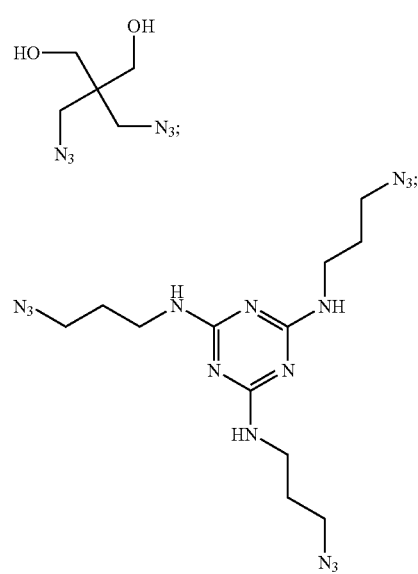

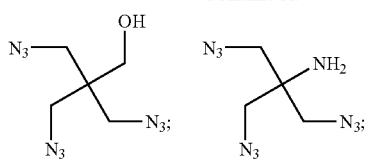

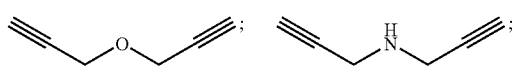

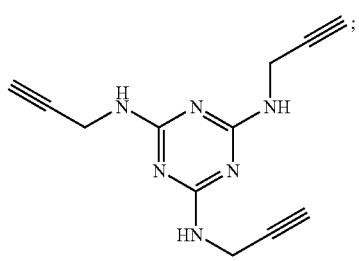

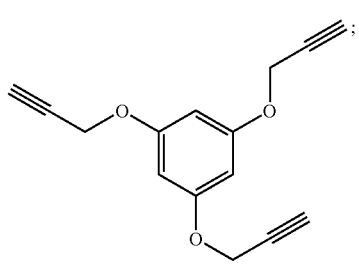

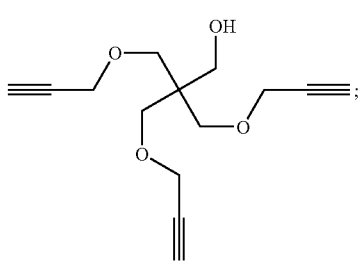

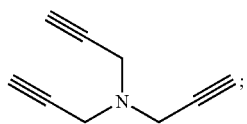

-continued

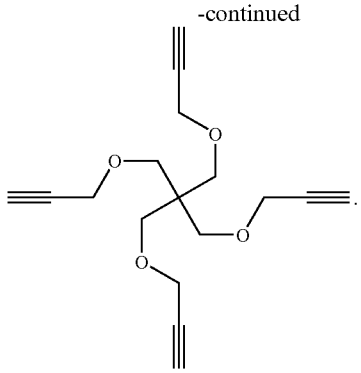

32. A process according to claim 31 wherein the preferred monomers have the following structures:

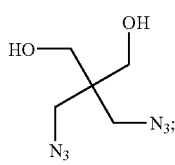

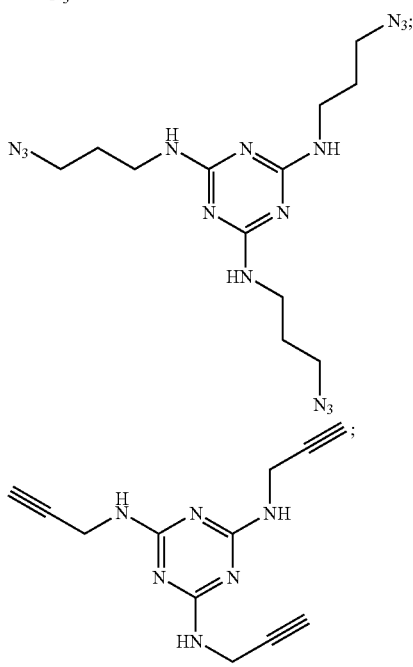

-continued

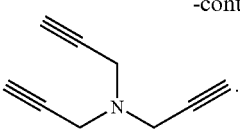

33. A method according to claim 32 wherein the preferred monomers have the following structures:

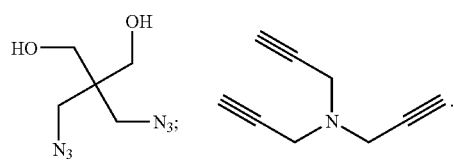

34. A process according to claim 19 wherein:
in said Step A, the mixture of multivalent monomers are applied onto the solid surface by
  Substep A(1): forming the mixture by dissolving the multivalent monomers in an organic solvent;
  Substep A(2): distributing the mixture in a uniform manner on the cleaned solid; and
  Substep A(3): allowing the organic solvent to evaporate from the distributed mixture.

35. A process according to claim 34 wherein:
in said Step B, the solid surfaces being placed into physical contact with each other with an application of a constant pressure while catalyzing the polymerization of the monomers.

36. A process according to claim 26 wherein:
in said Step A, the mixture of multivalent monomers are applied onto the solid surface by
  Substep A(1): forming the mixture by dissolving the multivalent monomers in an organic solvent together with a copper salt;
  Substep A(2): distributing the mixture in a uniform manner on the cleaned solid; and
  Substep A(3): allowing the organic solvent to evaporate from the distributed mixture.

37. A process according to claim 36 wherein:
in said Step B, the solid surfaces being placed into physical contact with each other with an application of a constant pressure while catalyzing the polymerization of the monomers.

38. An adhesive polymer cement formed between two or more solid surfaces according to claimed 19.

* * * * *